(12) United States Patent
Faulkner et al.

(10) Patent No.: US 11,698,718 B2
(45) Date of Patent: Jul. 11, 2023

(54) DYNAMICALLY SCALABLE SUMMARIES WITH ADAPTIVE GRAPHICAL ASSOCIATIONS BETWEEN PEOPLE AND CONTENT

(71) Applicant: MICROSOFT TECHNOLOGY LICENSING, LLC, Redmond, WA (US)

(72) Inventors: Jason Thomas Faulkner, Seattle, WA (US); Shalendra Chhabra, Seattle, WA (US); Eric R. Sexauer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/847,158

(22) Filed: Jun. 22, 2022

(65) Prior Publication Data

US 2023/0011810 A1    Jan. 12, 2023

Related U.S. Application Data

(63) Continuation of application No. 16/451,012, filed on Jun. 25, 2019, now Pat. No. 11,372,525.

(51) Int. Cl.
*G06F 3/0484* (2022.01)
*G06T 7/90* (2017.01)
*G06F 3/0481* (2022.01)
*G06Q 10/10* (2023.01)

(52) U.S. Cl.
CPC .......... *G06F 3/0484* (2013.01); *G06F 3/0481* (2013.01); *G06T 7/90* (2017.01); *G06Q 10/10* (2013.01)

(58) Field of Classification Search
CPC ......... G06T 7/90; G06Q 10/10; G06F 3/0484; G06F 3/0481
See application file for complete search history.

(56) References Cited

U.S. PATENT DOCUMENTS

| | | | |
|---|---|---|---|
| 10,263,799 B1 * | 4/2019 | Jouhikainen | G06Q 10/00 |
| 10,699,062 B2 * | 6/2020 | Hwang | G06N 3/084 |
| 10,832,009 B2 * | 11/2020 | Bonin | G06N 5/045 |
| 2012/0284640 A1 * | 11/2012 | Sloyer | G06Q 10/10 |
| | | | 715/753 |
| 2017/0277668 A1 * | 9/2017 | Luo | G06F 16/345 |
| 2018/0130496 A1 * | 5/2018 | Mahapatra | G11B 27/28 |

(Continued)

*Primary Examiner* — Tadesse Hailu
(74) *Attorney, Agent, or Firm* — Scott Y. Shigeta; Newport IP, LLC

(57) ABSTRACT

The techniques disclosed herein improve existing systems by providing a system that automatically generates a scalable summary with adaptable graphical associations between people and content. The system can select a level of detail that can be applied to a process for generating a summary of content. The level of detail can be based on a user's engagement with respect to one or more events. The system can improve the usability of the summary by selecting a level of detail that is optimized for the user's contextual status. The system also improves the user's interaction with a computer by providing an adaptable layout of information indicating a source of content. The adaptable layout allows users to readily identify topics, content sources, and high-priority summary sections regardless of the level of detail that is selected for the summary.

20 Claims, 16 Drawing Sheets

(56) References Cited

U.S. PATENT DOCUMENTS

2018/0284959 A1\* 10/2018 Alphin, III ........... G06Q 10/109
2018/0330736 A1\* 11/2018 Faulkner ................. G10L 17/00
2018/0331842 A1\* 11/2018 Faulkner ................. H04N 7/15
2019/0108271 A1\* 4/2019 Vikramaratne ..... G06F 16/9535

\* cited by examiner

DYNAMICALLY SCALABLE SUMMARIES WITH ADAPTIVE GRAPHICAL ASSOCIATIONS BETWEEN PEOPLE AND CONTENT

CROSS REFERENCE TO RELATED APPLICATIONS

This application is a continuation of and claims priority to U.S. application Ser. No. 16/451,012, entitled "DYNAMICALLY SCALABLE SUMMARIES WITH ADAPTIVE GRAPHICAL ASSOCIATIONS BETWEEN PEOPLE AND CONTENT," filed Jun. 25, 2019, which is incorporated herein in its entirety.

BACKGROUND

There are a number of different systems and applications that allow users to collaborate. For example, some systems allow people to collaborate by the use of live video streams, live audio streams, and other forms of real-time, text-based or image-based mediums. Some systems also allow users to share files during a communication session. Further, some systems provide users with tools for editing content of shared files.

Although there are a number of different types of systems and applications that allow users to collaborate, users may not always benefit from existing systems. For example, if a person takes time off from work, that user may miss a number of meetings and other events where content is shared between a number of different people. When it comes to tracking messages within a communication channel having a large number of entries, the user may have a difficult time following the conversation. Even worse, if a person is out of the office for an extended period of time, e.g., a vacation, there may be hundreds or even thousands of messages within a particular channel along with a vast amount of shared files. Any period of unavailability may cause users to miss a number of meetings and volumes of shared documents. Upon returning to work, it may take some time for that person to catch up with the activities of each missed event.

To address such concerns, some systems can generate a summary of content that a user may have missed while they were unavailable. A summary, for instance, may include bullet points of shared documents, segments of a meeting transcript, etc. A summary may allow a user to catch up with any number of missed events.

Although summaries can be used to help users catch up with missed events, current systems for generating summaries have a number of drawbacks. For instance, some summaries can be lengthy and not provide information at the right level of detail. Without providing information at an optimal level of detail, a generated summary may not be useful for some users. By providing too much information a user may ignore the summary, or by providing too little information, a summary may omit important details. Without providing the right information at the right level of detail, computing resources may be unnecessarily allocated to generate a summary that may not be used.

SUMMARY

The techniques disclosed herein provide a system that selects an optimized level of detail for generating an automatically scalable summary with adaptable graphical associations between people and content. The system can select a level of detail for a summary based on user activity. For instance, a level of detail can be based on a quantity of content associated with an event or a user's engagement level. The system can improve the usability of the summary by selecting a level of detail that is optimized for particular characteristics of an event and a user's interactions with the event. The system also improves the user's interaction with a computer by providing an adaptable layout of information indicating a source of content, e.g., people or computing devices providing content during an event. The adaptable layout allows users to readily identify people and other content sources, topics, and high-priority summary sections regardless of the level of detail that is selected for the summary.

In one illustrative example, when a user misses a meeting, a system can generate a summary of content that is shared during the meeting. The system can select a level of detail for the summary depending on an amount of content and/or an amount of time the user missed during the event. Once a level of detail is selected, the system can select salient content that was shared during the event for the summary. The system can also identify sources of the selected content. A source may include any entity associated with the content of a summary, such as a person, file, company, or a computer that provided the content. For instance, if the first sentence of a summary is based on a private chat of a meeting participant, a summary can include a graphical element that shows an association between the first sentence of the summary and an image of the meeting participant.

The system can display different layouts of information identifying a source of the content. A layout can be based on the level of detail selected for the summary. By selecting different layouts identifying the source of the content, a recipient of the summary can readily identify relevant sections of the summary. Once a summary is displayed, a user can adjust the level of detail of the summary. As the level of detail of a displayed summary is adjusted, the system can also select different layouts of information that identify a source of each section of a summary.

In another illustrative example, consider a scenario where a user misses a small portion, e.g., several minutes, of a meeting. When the user misses a small portion of an event, a system can generate a summary that includes granular details of the meeting contents, such as full sentences of a transcript. Based on that level of detail, the system can select a particular layout of information that provides more granular details of a person associated with the summary contents, such as a person's name, title, etc. However, if the user misses the entire meeting, or a large portion of the meeting, the system can generate a summary that only includes headlines of several key topics. Based on that level of detail, the system can select a particular layout of information that provides details that represent a person associated with the summary contents, such as a color or icon that represents the person. By having certain layouts with representations of a source, users can readily see sections of a summary that are more relevant to them without having to review low-level details to identify pertinent sections.

The generated summaries can also evolve dynamically as each source of information engages in different activities. For instance, in the above referenced example, a summary can be generated based on a meeting. The summary can include specific phrases that are associated with specific people. Even after the summary is generated, the summary can be updated dynamically as each person engages in subsequent meetings. Thus, if a meeting participant made a statement in the first meeting assigning a task to a recipient of the summary, that task may be updated when the meeting participant engages in subsequent activities, such as subsequent meetings, chat communications, or makes a contribution to a document. Thus, each summary generated by a system can be updated in real time, thereby increasing the usability and accuracy of each summary. The summary can also be updated based on activity of the recipient of the summary. For instance, when the recipient performs an assigned task, a system can update the summary to indicate the recipient's progress.

The techniques described above can lead to more efficient use of computing resources. In particular, by automating a process for generating a customized summary, user interaction with the computing device can be improved. The techniques disclosed herein can lead to a more efficient use of computing resources by eliminating the need for a person to perform a number of manual steps to search, discover, review, display, and retrieve vast amounts of data they have missed during a user's inattentive status. In addition, the automatic generation of a summary having content at a level of detail that is based on user activity can improve the usability of a summary. The automatic generation of a summary having customized layouts of information identifying a source of the summary contents can also improve the usability of a summary. By having a more targeted level of detail a system can mitigate the need for manual processes to search for and retrieve information. The reduction of manual processes and the reduction of a need for manual entry can lead to fewer inadvertent inputs and errors. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. References made to individual items of a plurality of items can use a reference number with a letter of a sequence of letters to refer to each individual item. Generic references to the items may use the specific reference number without the sequence of letters. The same reference numbers in different figures indicate similar or identical items.

FIG. 8B illustrates a user interface showing a user selection of a section of a summary.

FIG. 8C illustrates a user interface displaying details of a file associated with a section of a summary.

DETAILED DESCRIPTION

Figure 1:
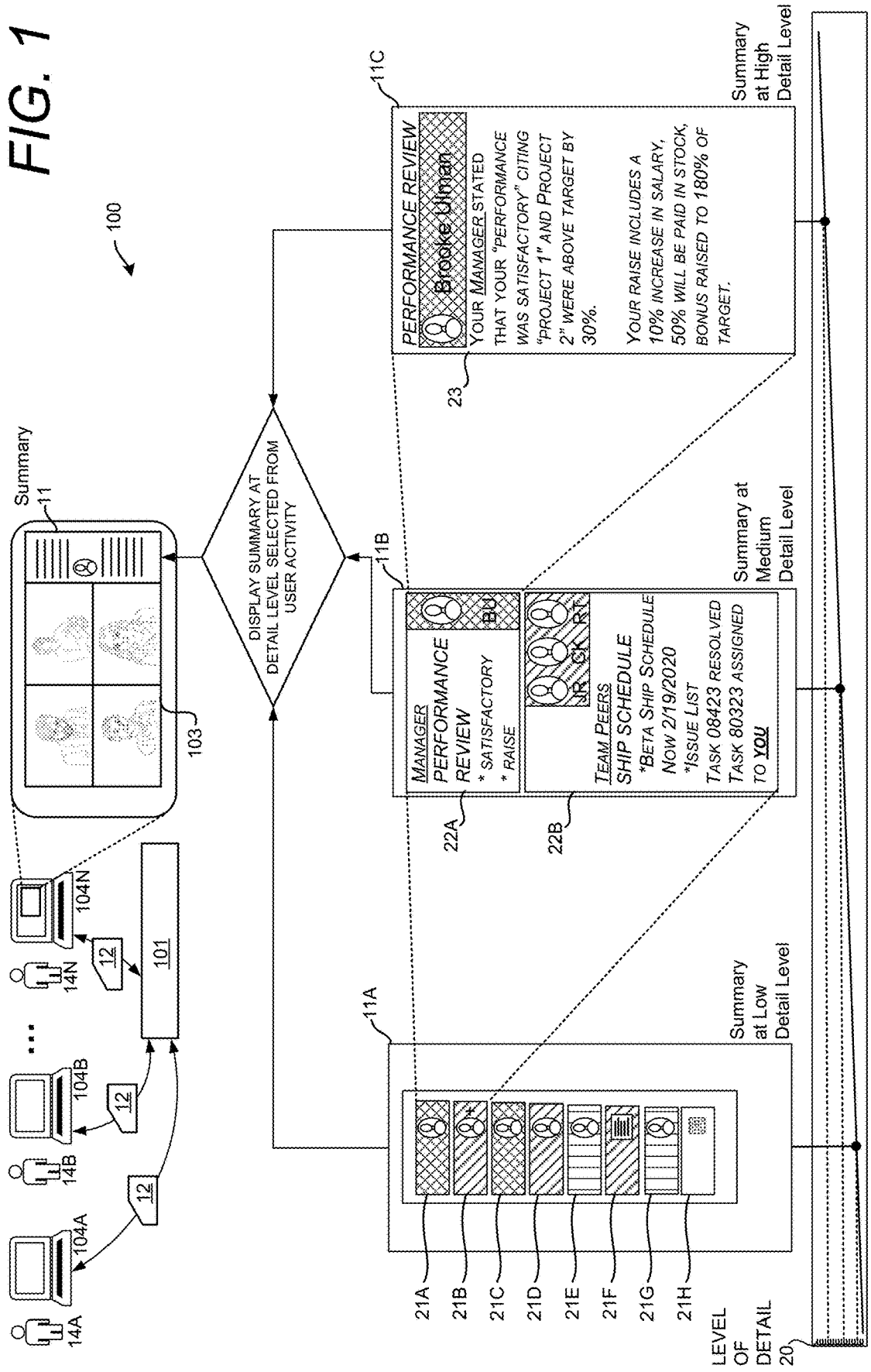
FIG. 1 illustrates aspects of a system for generating customizable summaries with dynamically scalable graphical associations between people and content.

FIG. 1 illustrates a system 100 for automatically generating a scalable summary 11 with adaptable graphical associations between people 14 and content 12. The system 100 can select a level of detail 20 that can be applied to a process for generating the summary 11 of content 12. The level of detail 20 can be based on a user's engagement with respect to one or more events. The system 100 can improve the usability of the summary 11 by selecting a level of detail that is optimized for the user's contextual status. The system 100 also improves the user's interaction with a computer by providing an adaptable layout of information indicating a source of content 12. The adaptable layout allows users to readily identify topics, content sources, and high-priority summary sections regardless of the level of detail that is selected for the summary.

The level of detail 20 can be determined in response to an analysis of different types of user activity. In some configurations, the level of detail 20 can be selected based on a user's engagement with respect to an event. For example, a level of detail of a summary can be selected based on an amount, e.g., a proportion, of one or more events during which a user had a less than threshold level of engagement. Thus, the system can detect a time period in which a person was unavailable, e.g., not engaged with content shared during an event. The system can then determine a level of detail for a summary based on the time the user was unavailable. The summary is generated based on the determined level of detail and displayed to inform the user of content that may have been missed. Content can include any content that is shared in association with an event, such as files, images, video data, etc. Content can also include transcripts of a meeting, information about attendees of a meeting, etc.

For illustrative purposes, consider a scenario where a user, such as the third user 14N, is scheduled to attend a meeting. The meeting can be an in-person meeting or a meeting that is facilitated by communication system. In a scenario involving a communication system 101, a number of different users (14A-14N) can communicate with each other and share content 12 via a number of client computing devices 104. The communication of the devices 104 may be managed by the system 101, which may include modules for managing a service such as MICROSOFT TEAMS, AMAZON CHIME, SLACK, GOOGLE HANGOUTS, etc.

For illustrative purposes, FIG. 1 provides three examples of different versions of a summary 11, each of which are generated using a different level of detail. In this example, the system 100 selects a level of detail based on the user's actions with respect to a meeting. The system 100 can then generate a summary 11 based on the selected level of detail, and display the summary 11 to one or more users 14 via a user interface 103.

The system can select a level of detail based on a proportion of the meeting the user was, or is scheduled to be, unavailable. For instance, if the user misses an entire meeting, the system can select a low level of detail and generate a summary, such as the first summary 11A. If the user misses an intermediate portion of the meeting, the system can select a medium level of detail and generate a summary, such as the second summary 11B. If the user misses a relatively small portion of the meeting, e.g., a few minutes of a two-hour meeting, the system can select a high level of detail for a summary, such as the third summary 11C.

In the first example, the summary 11A having a low level of detail comprises a number of simplified graphical elements 21A-21H (individually and collectively referred to herein as "graphical elements 21"), each of which represent a source of content for individual sections of the summary. In this example, the simplified graphical elements 21 include display properties representing a source of content that is included in the summary. The display properties can include colors or shapes that represent a participant of the meeting or a computing device that provided content. By displaying a simplified graphical element 21 representing a source while minimizing the display of the content itself, a recipient can readily identify important sections of the summary without requiring the user to traverse volumes of content.

The simplified graphical elements 21 can be configured with a color (represented by a fill pattern) scheme that identifies people. The people and/or the colors can be obtained by the use of a database, such as an organizational chart. For instance, a color of the first graphical element 21A and the third graphical element 21C can be used to represent the user's manager. A color of the second graphical element 21B and the fourth graphical element 21D can used to represent the user's peer. The colors of other graphical elements, e.g., 21E-21H, can be used to represent other people or computing resources having another priority level. By presenting a layout of simplified graphical elements 21 identifying sources of content, the user can readily identify important sections of the summary, e.g., sections of the summary that have content provided by his or her manager or peers.

In the second example, the summary 11B having a medium level of detail comprises a number of semi-detailed graphical elements 22A-22B ("graphical elements 22"), each of which represents a source of content and select portions of the content. The semi-detailed graphical elements 22 comprise a medium level of detail. Specifically, the semi-detailed graphical elements 22 comprise the display properties identifying a source of information along with additional details such as a title of the source. In addition, the semi-detailed graphical elements 22 comprise Topics of the content 12.

The first graphical element 22A includes a color (represented by a fill pattern) that represents the user's manager and the initials of the user's manager. In addition, the first Graphical element 22A includes the title of the source, e.g. "Manager," and several headlines of the salient content that is selected from the communicated content 12 for inclusion in the summary. In this case, the graphical element 22A includes a topic "performance review" and two Subtopics, "Satisfactory" and "Raise."

The second graphical element 22B also includes a color that represents the user's peers and the Initials for each peer. In addition, the second graphical element 22B includes a title associated with the source, e.g., "team peers," listing several headlines of the salient information that is selected for the summary. In this case, the second graphical element 22B includes several topics and subtopics referring to a ship schedule and several tasks.

In the third example, the summary 11C having a high level of detail comprises a detailed graphical element 23, which represents a source of content. In this example, the detailed graphical element 23 comprises a high level of detail with respect to content. Specifically, in this example, the detailed graphical element 23 comprises the display properties identifying a source of information along with additional details such as a description of the relationship between the source of the content and the user. In addition, the detailed graphical element 23 comprises specific quotes from the content. In this example, a sentence is generated indicating that the user's "manager stated that your "performance was satisfactory" citing "project 1" and Project 2" were above target by 30%." In addition, other quoted content describing one of the subtopics is provided. This embodiment enables a user to readily view specific details of content they may have missed. By providing quoted content, the system can also reinforce the accuracy of the content of the summary. These examples are provided for illustrative purposes and are not to be construed as limiting. It can be appreciated that the system can a generate a summary at any level of detail based on user activity.

Figure 2:
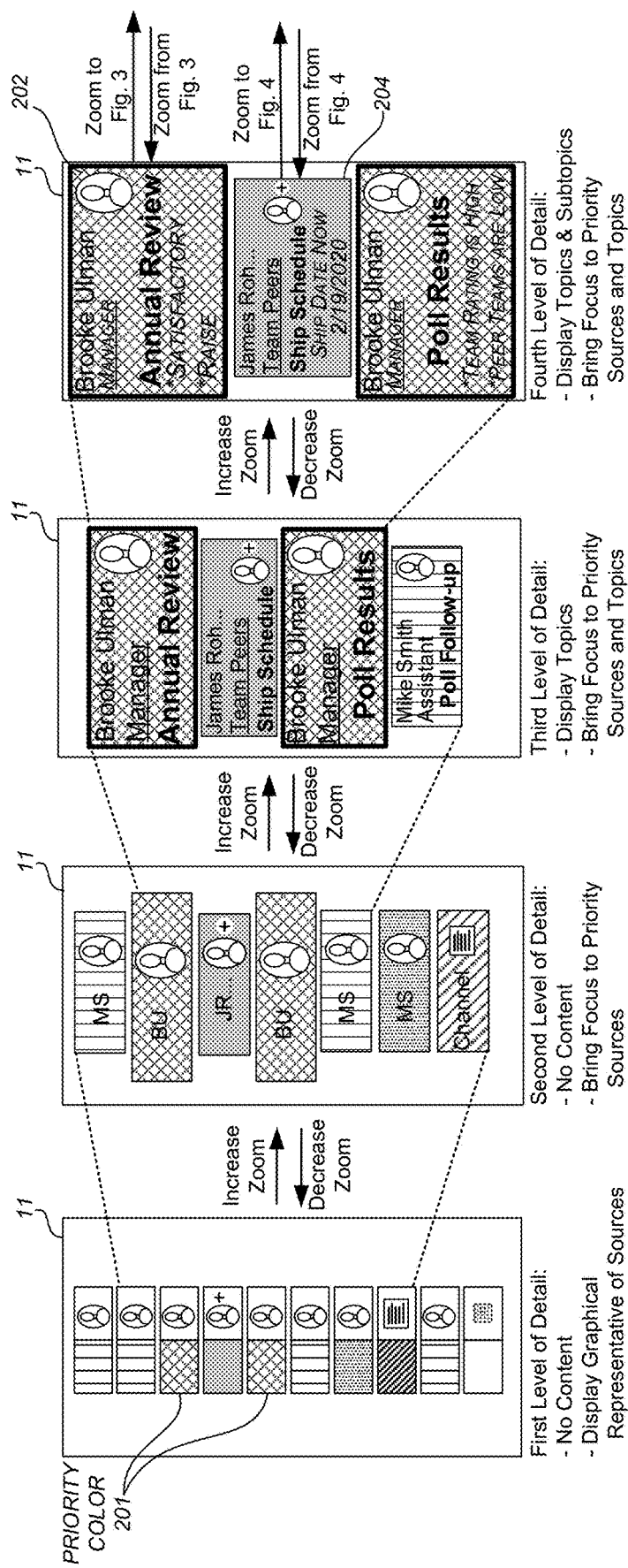
FIG. 2 illustrates a series of summaries at different levels of detail.
Figure 3:
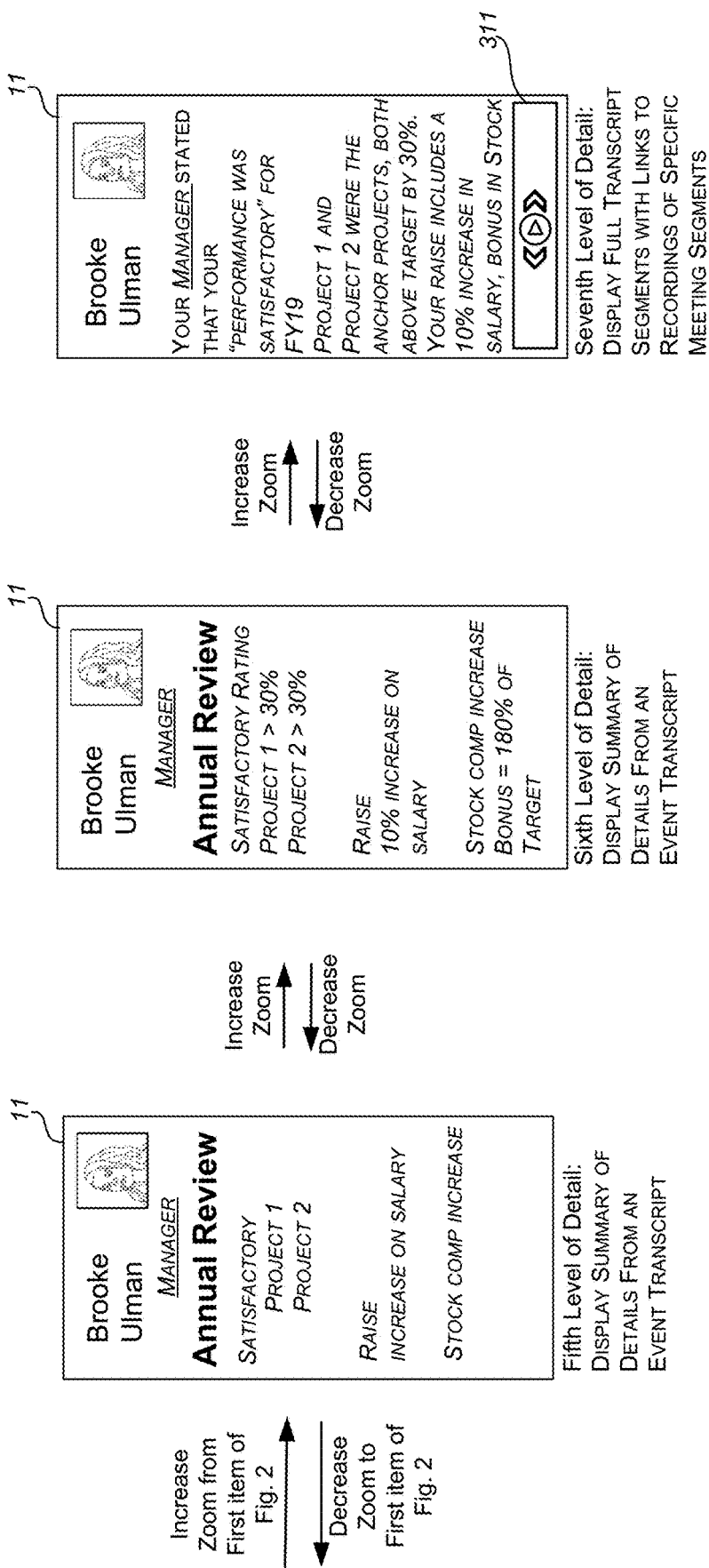
FIG. 3 illustrates a first section of the summary shown in FIG. 2 shown at different levels of detail, each level of detail including different layouts for associating sections of content and a source of the content.
Figure 4:
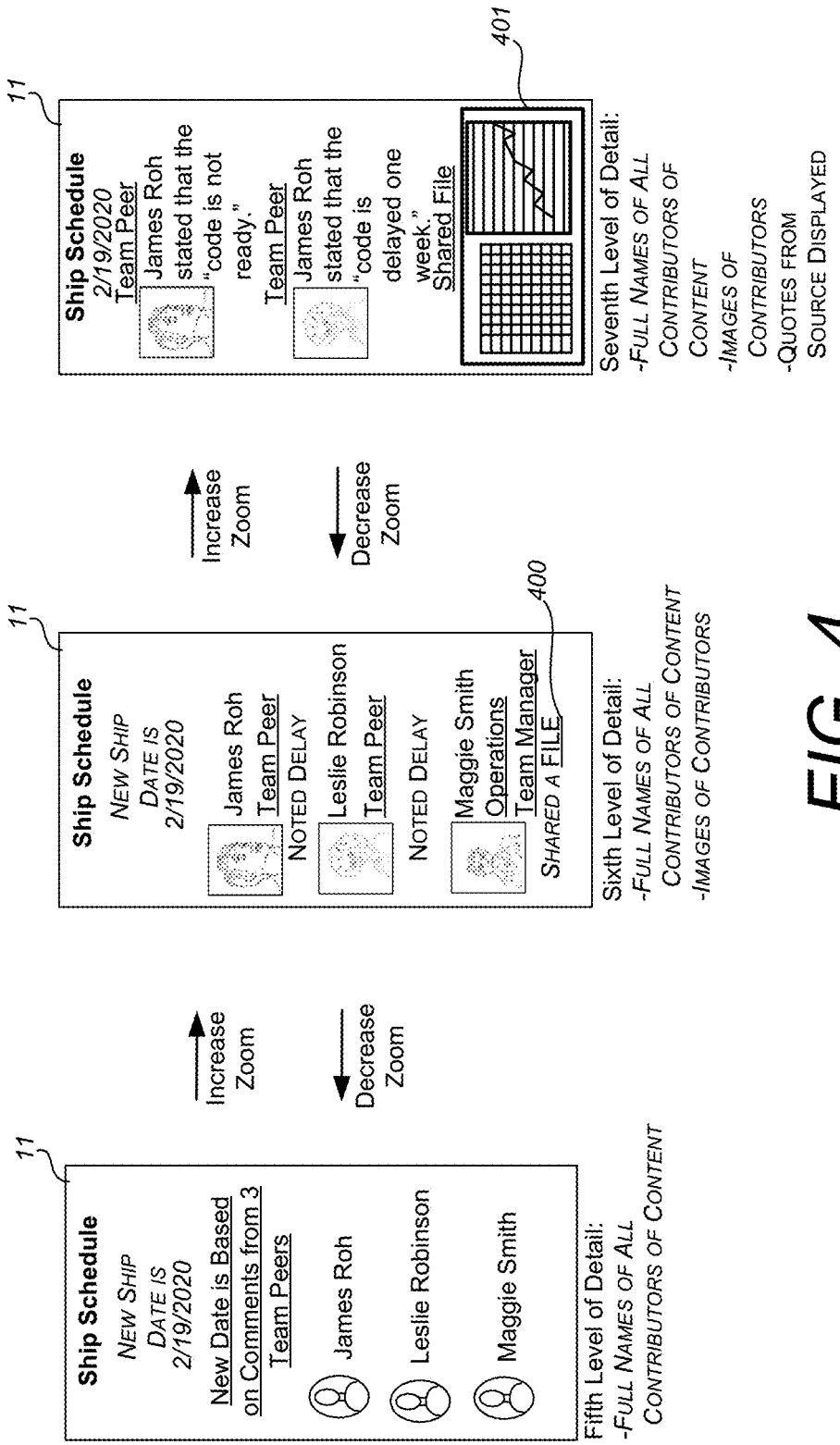
FIG. 4 illustrates a second section of the summary shown in FIG. 2 shown at different levels of detail, each level of detail including different layouts for associating sections of content and a source of the content.

Once the summary 11 is displayed to the person using an initial detail level 20, the system can scale the detail level, e.g., control a zoom level of specific sections of the summary, in response to an input or a triggering event. For instance, in response to an input or a triggering event that indicates a new detail level, a system may modify the display of the summary to include an updated layout of information that associates the source with a portion of the content that is included in the summary. The updated layout may also include a portion of the content based on the new detail level. The input may be a voice command or a person's interaction with a user interface. The triggering event may include any type of activity such as an update to the content. For instance, if a summary is displayed to a viewer and the system detects an update to the content related to the summary, the system may change the level of detail to show more or less content related to the updated content. FIGS. 2, 3 and 4 illustrate aspects of such features.

FIGS. 2, 3 and 4 illustrate several examples of different versions of a summary 11, each of which are based on a different level of detail. As summarized above, the system can determine a level of detail for a summary and generate a display of a summary at that selected level of detail. After the system displays the summary at the selected level of detail, the user can traverse different levels of detail by providing input. The input can be in the form of an interaction with an input device such as a mouse or keyboard, or the input can be provided by voice command via a microphone. Other forms of input can involve the use of a touchscreen or camera, where one or more gestures can be received to scale a summary to a lower level of detail or a higher level of detail.

A summary can be generated using a range of detail levels. FIG. 2 illustrates several examples of different versions of the summary generated at different detail levels. A summary can have a low level of detail, as shown in the example in the far left, and progressively include additional details of content. For example, at the first level of detail, a summary may not contain details of the content associated with an event. Instead, the summary may include graphical representations of a source of content for individual sections of a summary. In some configurations, this simplified version of a summary can include a number of different colors (represented by a fill pattern) to represent a particular source. Particular colors can be used to identify a priority for a particular source. For instance, a priority color 201 can be utilized to identify an important source, such as a person's manager, or an important team member. This way, if there are many entries, a user can readily scan a simplified summary format to identify information that may be important to them. In some configurations, a color key can be utilized to convey priority colors shown as one color per user. The color key can also be provided by a computer-generated voice output.

At a second level of detail, a summary may bring focus to one or more Sections of a summary associated with a priority source. The system may bring focus to a particular source of information by modifying one or more display properties for a particular source. For instance, the system may highlight or resize a particular section of a summary to bring focus to one or more priority sources. The priority sources may be identified by a user preference file or an organizational chart. People or computing resources that have a threshold level of association with a particular user can be identified as a priority resource. In this example of a summary at a second level of detail, the sections of the summary that are associated with the user's manager are enlarged to bring focus to those sections. In this example, a graphical element 202 can also be generated for the purposes of indicating additional sources of information. This may be useful in a situation where multiple participants of an event have contributed to a topic of a particular section of the summary.

At the third level of detail, a summary can bring further focus to one or more Sections of a summary associated with the priority source. At this level, the system can also start to introduce certain aspects of the content associated with the event. For instance, headlines or key topics can be introduced in each section of the summary. As shown, the system can maintain any identifier with respect to a source, such as a color, name or other identifiers. As shown, at this level of detail, a summary can also include more details regarding a particular source, such as a name and/or title of a source of information. In this example, the name and title of the user's manager is included in each section of the summary. In addition, the system generates further emphasis to the priority sections of a summary by applying a formatting bolding certain sections of text, such as a headline or a topic. In addition, the system can bring emphasis to a border of a section of a summary. This example is provided for illustrative purposes and is not to be construed as limiting. It can be appreciated that any other display property may be modified to bring focus to a particular section of a summary or a resource associated with a section of the summary.

At the fourth level of detail, a summary can bring further focus to one or more Sections of a summary. In this example, each Section of the summary comprises additional aspects of the content. For instance, Topics and Subtopics are included in each section of the summary. Additional details providing facts in the Topic may also be displayed. At this level of detail, in addition to a Topic, such as the "annual review" topic, a summary may also include Results, e.g., text such as "satisfactory" or "raise."

From the example summary shown on the right side of FIG. 2, a user can increase the scale of the particular summary to obtain further information with respect to a particular section of a summary. For example, a user can scale into the first section to view further information with respect to the annual review. In response to a user input, a summary can transition from the fourth example on the right side of FIG. 2 to the first example shown in the left side of FIG. 3.

In response to an input causing the system to zoom into the first section 202 of the summary 11 generated at the fourth level of detail (FIG. 2), the system displays the summary generated at the fifth level of detail (FIG. 3). At the fifth level of detail, additional details of each headline may be provided. In this example, the system displays specifics such as project names, e.g., "Project 1" and "Project 2," that are associated with the Topic, e.g., satisfactory. The system may also display additional results, e.g., "increase in salary" and "stock compensation increase," of a headline, e.g., "raise."

As the system receives an input to increase the zoom, e.g., increase the level of detail, the system can provide additional details for each topic of a summary. The system can also select appropriate layouts associating the source to the content as the level of detail of the content changes. The system can eventually reach an upper limit on the level of detail, e.g., the seventh level of detail shown in the summary shown on the right side of FIG. 3. At this level of detail, the system can display raw data from the content associated with an event. For instance, if the content comprises a transcript, the system may display quoted content. In this particular example, quoted statements directly made from the manager during an event are included in the summary. By displaying punctuation or other visual indicators indicating that the system is providing quoted material content, the system can provide an increased level of assurance as to the accuracy of the summary. In some configurations, a summary that is generated based on a high level of detail, e.g., such as the seventh level of detail, can include one or more links to recorded content. For instance, any word, phrase, or sentence of a summary can include a link to recorded content, video and/or audio, that is associated with the text of the summary. For instance, if a user selects the term "Project 1," a computing device can retrieve the recording associated with that term and play a portion of the event that was used as a basis for this portion of the summary. In addition, the summary 11 can also include one or more playback controls 311 for enabling a user to play, index, and navigate through recordings or other content related to the summary.

The following description describes the transition between FIG. 2 and FIG. 4. In response to an input causing the system to zoom into the second Section 204 of the summary 11 generated at the fourth level of detail (FIG. 2), the system displays the summary 11 generated at the fifth level of detail (FIG. 4). At the fifth level of detail, additional details of each headline may be provided. In this example, the system displays specifics of each source. In this example, the headline regarding the new ship date was created by comments from three different team peers. Such information, such as each person's name, can be displayed in the summary.

As the system receives an input to increase the zoom, e.g., increase the level of detail, the system can provide additional details for each source. For instance, as shown in the sixth level of detail (FIG. 4) images identifying the sources can be displayed. In addition, descriptions regarding their conversation can be displayed. A description can include an order in which a source contributed to a conversation or a role of each contributor. In this example, the first two contributors of the conversation stated the source of the delay and the last contributor of the conversation confirmed the delay. At this level of detail or other levels, the system can also start to show links to shared files. In this example, a particular team peer, Maggie, shared a file during the event. When the system detects such activity, at one or more levels of detail, the system may display a link 400, that provides access to the shared file. The system can provide access by allowing the user to download the file or the system can provide access by showing one or more views of the file contents, such as the views shown in other examples described herein.

In addition to showing links to files that are shared during an event, the system can also identify and provide access to other related files. For instance, the system may analyze a data store, e.g., GOOGLE DRIVE or ONEDRIVE accounts, of each participant of an event. The system may also identify files having a threshold level of relevancy to one or more topics of the event. The system can then display links to each file having a threshold level of relevancy to the event.

When the system receives an additional input to increase the zoom, the system can eventually display a high level of detail, e.g., the seventh level of detail shown in the summary shown on the right side of FIG. 4. At this level of detail, the system can display raw data from the content associated with an event. For instance, if the content comprises a transcript, the system may display quoted content. By displaying punctuation or other visual indicators indicating that the system is providing quoted material content, the system can provide an increased level of assurance as to the accuracy of the summary. At this level of detail, or other levels, the system can also display a view 401 of the shred file within the summary 11. The view 401 of the file contents can be a static view of the file contents, or the view 401 can be an interactive display that allows users to edit the file contents as well as view modifications to the file contents that are performed by other users.

These examples are provided for illustrative purposes only and are not to be construed as limiting. It can be appreciated that the system can generate many more versions of a summary at many more or fewer levels of detail. It can also be appreciated that different types of content can be selected for a summary at each level. Thus, certain detail levels can include different types of titles, headlines, topics, or subtopics. In addition, each layout of information identifying a source can include different types of information, e.g., titles, names, identifiers, etc. Layouts used for certain levels of detail can include any combination of information and/or graphical indicators having a color (represented by a fill pattern) representing a source of information. The color can be selected from a process that gathers image data with respect to a source of information. For instance, a camera can be directed towards a participant of a meeting. Captured image data can be used to identify one or more colors that can represent the user. The colors can be obtained by an analysis of an article of clothing, or an article's position within the environment. The graphical indicators can also represent other characteristics that can be used to identify a particular source of information, such as a company, an entity at a particular geographic location, etc.

Figure 5:
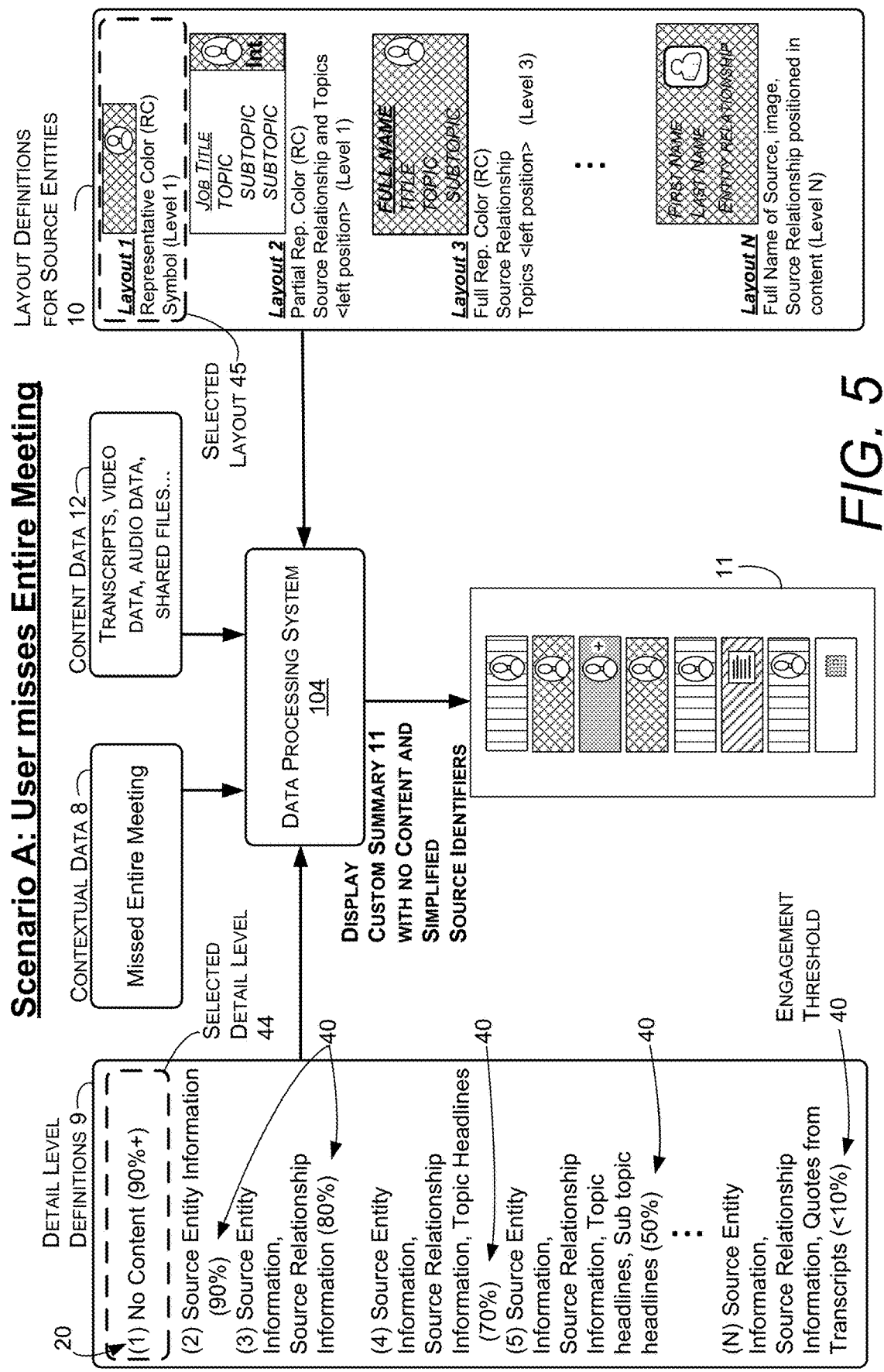
FIG. 5 illustrates a first user scenario utilizing a sample set of contextual data, content data, detail level definitions, and layout definitions that can be used for generating a summary.
Figure 6:
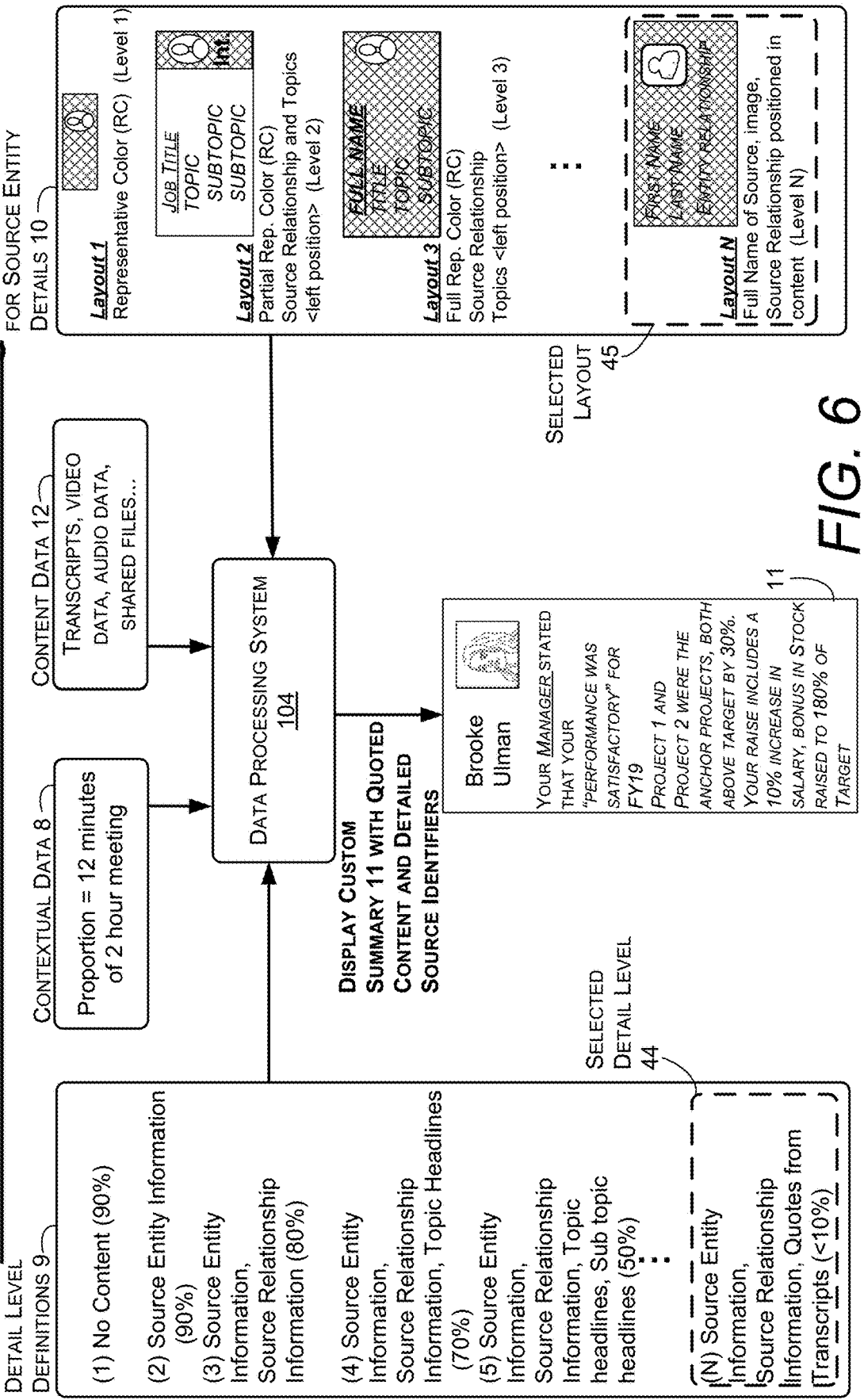
FIG. 6 illustrates a second user scenario utilizing a sample set of contextual data, content data, detail level definitions, and layout definitions that can be used for generating a summary.

Turning now to FIG. 5 and FIG. 6, some example data sets for generating a summary at a particular level of detail are provided. With respect to FIG. 5, a data processing system 104 can generate a summary 11 in response to receiving contextual data 8, data defining detail level definitions 9, layout definitions 10, and content data 12. In this example, the contextual data 8 indicates that a user has missed an entire meeting. Such data can include a user input, sensor data indicating a user's activity, etc. based on the proportion of an event in which a user had less than a threshold level of engagement. Also, in this example, the content data 12 comprises transcripts, video data, audio data, and shared files.

The data processing system 104 analyzes the contextual data 8 to determine a selected level of detail 20 based on the detail level definitions 9. In some configurations, each detail level can be associated with a proportion limit 40 or other activity data definitions. For instance, the first level of detail, the level including "no content," can be associated with a proportion limit 40 ranging from 90 percent to 100 percent. Thus, if a person misses a majority of a meeting, e.g., over 90 percent, the first level of detail can be selected. Different proportion limits 40 can be associated with other levels of detail, e.g., 80%, 70%, or 60% for other levels of detail. In this example, based on the contextual data 8, the data processing system 104 selects the first level of detail, which causes the data processing system 104 to generate a summary without content.

In some configurations, the system can analyze the activity of the one or more users to determine a proportion of the one or more events when the engagement level is below an engagement threshold, e.g., a user's location outside of a distance of a location of an event, and/or a user indicated by an input that they are not going to be present in a meeting. The detail level can be determined to be above a predetermined level, e.g., the first level (1), second level (2), or any other level, when the proportion, e.g., a percentage of the meeting, is below a predetermined proportion limit 40. Thus, the level can be high when a user misses 10% of an event. The detail level can be higher as a person misses a larger proportion of a meeting.

The system can also determine a selected layout 45 based on the selected level of detail 44 and the layout definitions 10. In some configurations, the layout definitions can be directly associated with one or more levels of detail. For instance, the first and second level of detail can be associated with the first layout and the second layout in the layout definitions 10. The third layout may be associated with the fourth and fifth level of detail, etc.

In the example of FIG. 5, based on the contextual data 8, the system selects the first level of detail and correspondingly the first layout. Based on the selections, the appropriate level of content data is included in the summary 11. As shown, at the first level of detail, the summary includes representative colors (represented by a fill pattern) for each section of the summary. In addition, the representative colors represent individual sources of the content. Such an example may result from a transcript, video data, or audio data where different entities, e.g., individuals, computer systems, or services, are contributing content. This format of the summary enables the user to quickly review a high-level outline of different topics and quickly identify sources of information that are important to them. For instance, if a color represents a particular source of information, such as a person's manager, the user can readily identify those sections of an event and then perform one or more inputs to zoom into those sections of the summary.

With respect to FIG. 6, a data processing system 104 can generate a summary 11 in response to receiving contextual data 8, data defining detail level definitions 9, layout definitions 10, and content data 12. In this example, the contextual data 8 indicates that a user has missed a fraction of an event, e.g., 12 minutes of a two-hour meeting. Similar to the previous example, the content data 12 comprises transcripts, video data, audio data, and shared files.

The data processing system 104 can analyze the contextual data 8 to determine the level of detail based on the detail level definitions 9. In some configurations, each detail level can be associated with a proportion or other activity data definitions. For instance, the highest level of detail, e.g., Detail Level "N," may be selected given that the user missed less than a threshold portion, e.g., 10%, of the meeting. In this example, based on the contextual data 8, the data processing system 104 selects the highest level of detail (Detail Level N), which causes the data processing system 104 to generate a summary quoted text from transcripts.

A layout can be selected based on the selected level of detail 44 and the layout definitions 10. In some configurations, the layout definitions can be associated with one or more levels of detail. For instance, the first and second level of detail can be respectively associated with the first layout and the second layout in the layout definitions 10. The third layout may be associated with the fourth and fifth level of detail, etc.

In the example of FIG. 5, based on the contextual data 8, the system selects the highest level of detail (Detail Level N) and correspondingly the last layout (Layout N). Based on the selections, the appropriate level of content data is included in the summary 11. As shown, at the highest level of detail, the summary includes a full name of the source, an image of the source, and quoted content. This format of the summary enables the user to readily view a relevant section of an event that they may have missed based on their activity.

Figure 7A:
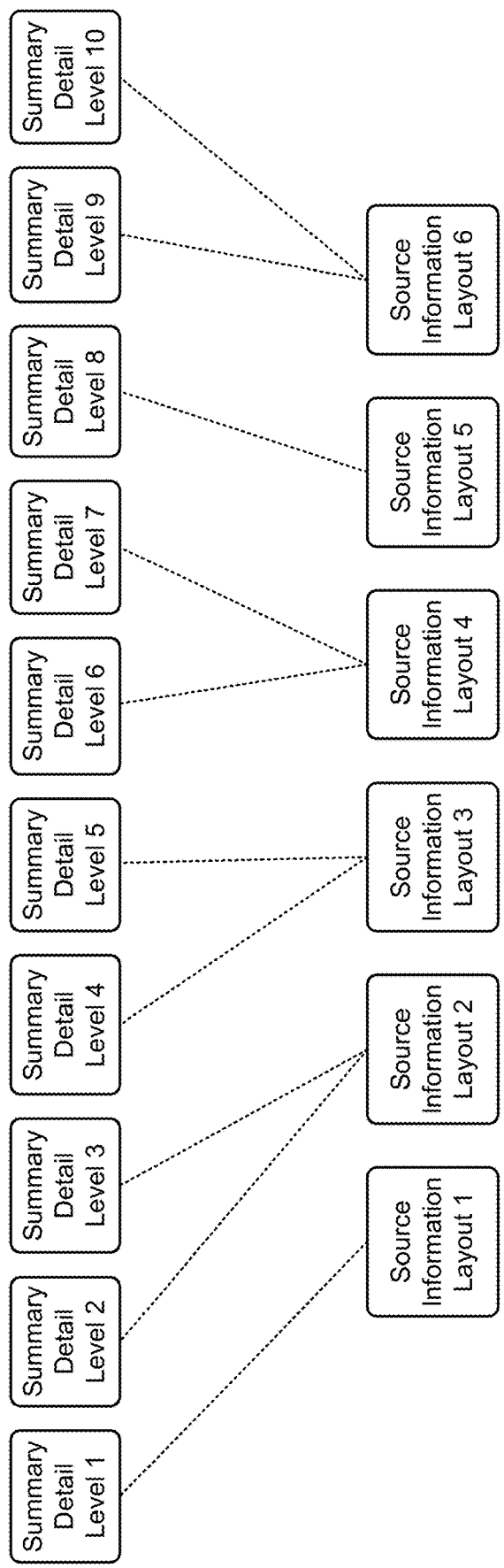
FIG. 7A illustrates a first sample set of data illustrating associations between various detail levels for a summary and layouts for information identifying a source of content.
Figure 7B:
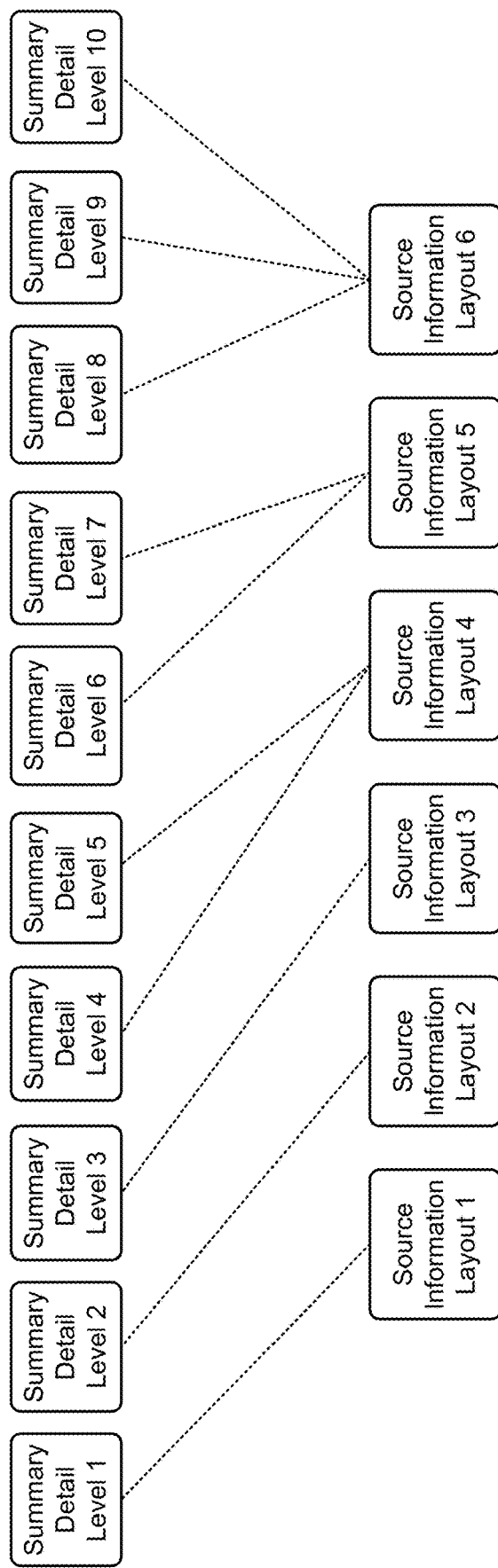
FIG. 7B illustrates a right-shifted weighted sample set of data illustrating associations between various detail levels for a summary and layouts for information identifying a source of content.
Figure 7C:
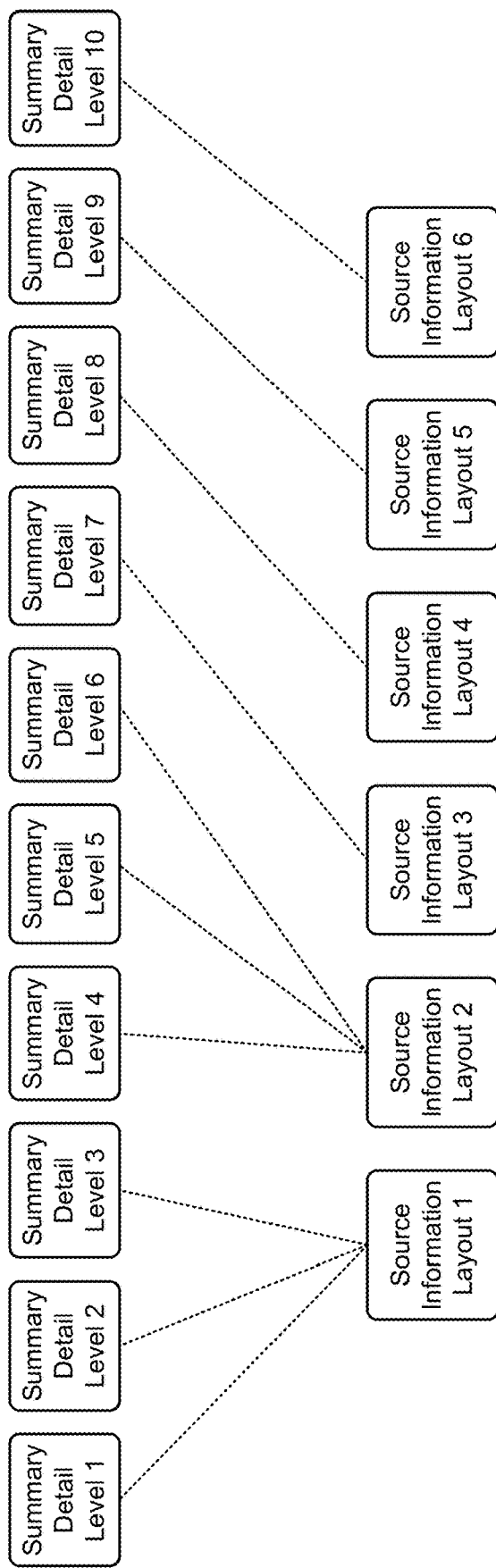
FIG. 7C illustrates a left-shifted weighted sample set of data illustrating associations between various detail levels for a summary and layouts for information identifying a source of content.

Turning now to FIGS. 7A, 7B, and 7C, different patterns of associations can change the characteristics of how the layouts are displayed based on the zoom level. Depending on a number of factors, such as a quantity of content, a number of sources that are involved, and/or a proportion of an event a user may have missed, different layouts can have different patterns of associations with specific levels of detail. The example shown in FIG. 7A illustrates a relatively uniform distribution between the layouts and the levels of detail. This way, as the system receives an input for changing the level of detail for a displayed summary, the layouts for the source information can be modified in a uniform fashion.

The example shown in FIG. 7B illustrates a right-shifted distribution between the layouts and the levels of detail. Such a distribution can be utilized to accommodate a number of different scenarios. For instance, a right-shifted distribution between layouts and the level of detail may be selected in the scenario where a source of information has a threshold priority level. Thus, for high-priority content, if the initial display of a summary involves a low level of detail, e.g., level 3, and the user from that point begins to zoom towards a higher level of detail, the system would show more detail regarding the source sooner than a list shifted distribution as shown in FIG. 7C. As can be appreciated, in the configuration shown in FIG. 7C, the user would be required to zoom all the way to the top level to view the full final layout of the source information. Thus, in one scenario, the configuration shown in FIG. 7C would apply to a scenario where the source has a lower priority.

The associations between the layouts and the detail levels can be weighted based on a number of different factors. In another example, the associations can be weighted based on the number of sources associated with the particular event and/or a number of sources associated with shared content. For instance, each of the configurations in FIGS. 7A, 7B, and 7C can be selected when a number of sources, people or computing devices provide content, or are above or below a particular threshold.

Figure 8A:
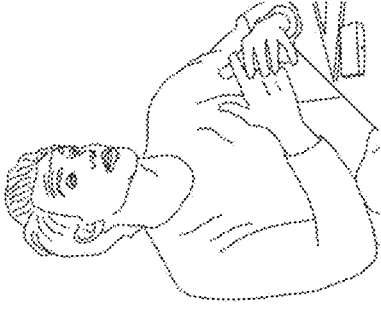
FIG. 8A illustrates a user interface displaying a summary in conjunction with the contents of a meeting.
Figure 8B:
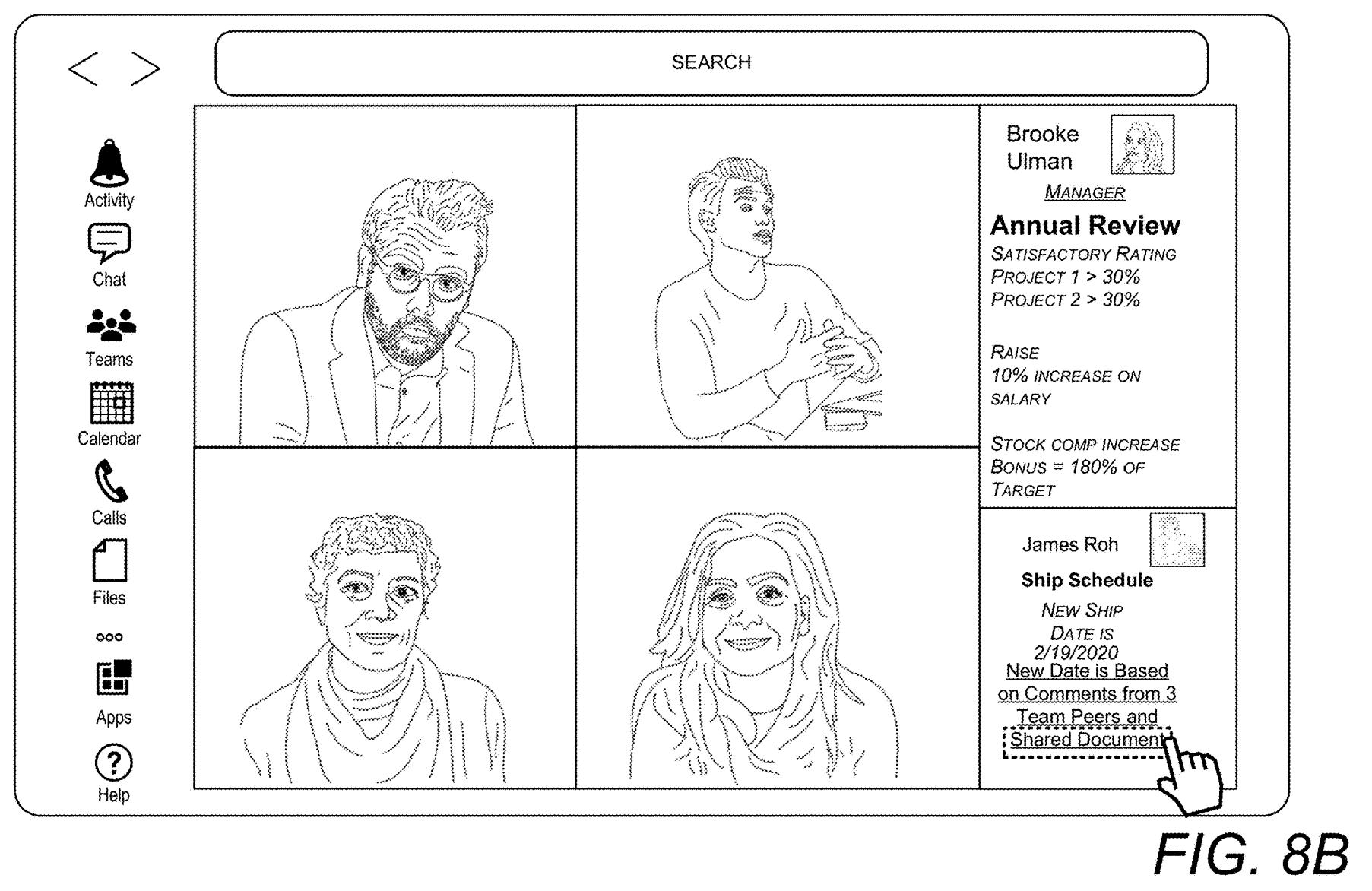
Figure 8C:
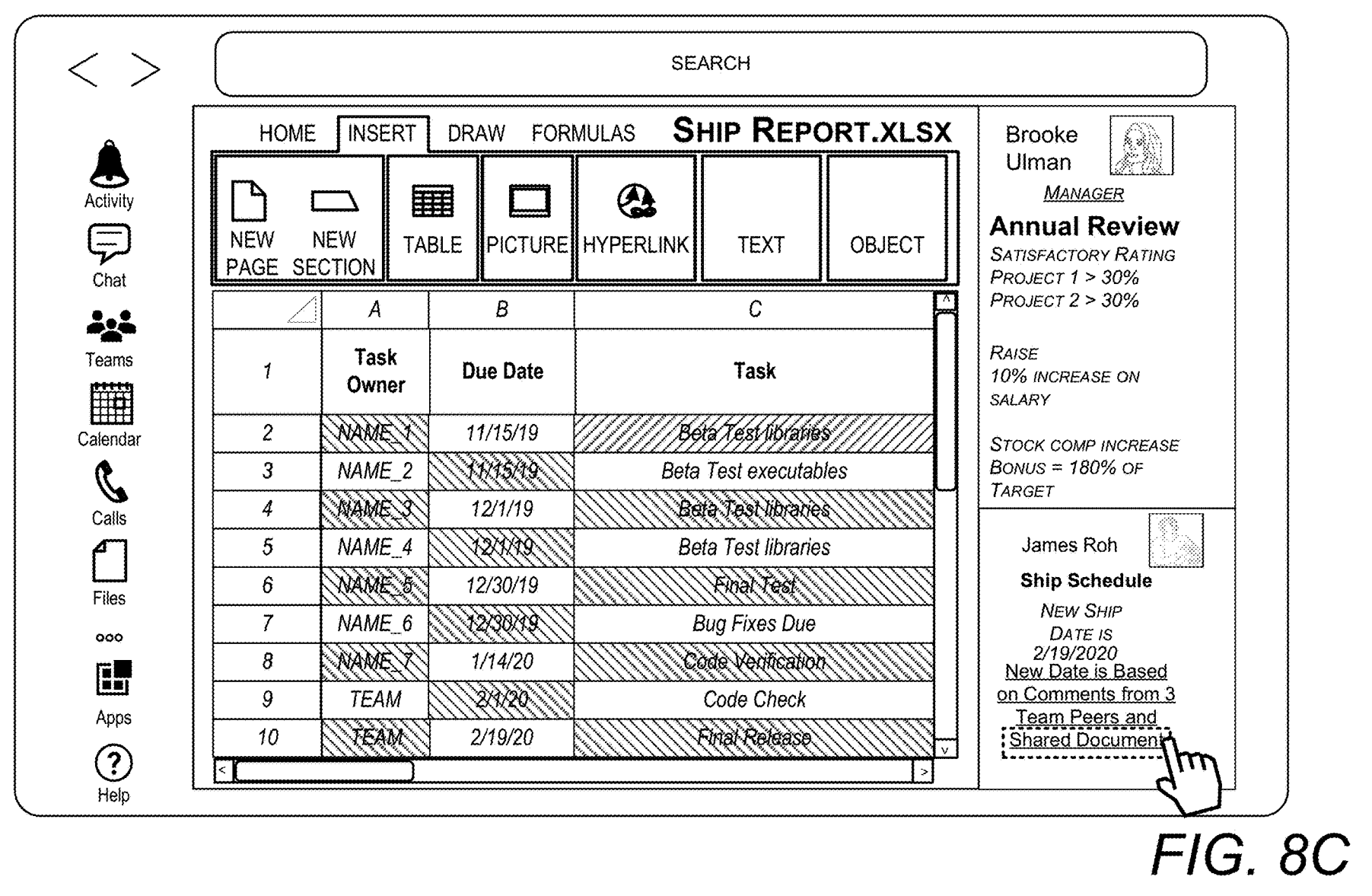

FIGS. 8A, 8B, and 8C illustrate example user interface arrangements showing a generated summary in conjunction with a number of rendered streams of a communication session. These examples further illustrate how a summary can be configured to cause an application managing a communication session to change a display mode to allow access to editing tools for a particular document. For instance, in the summary shown in FIG. 8A, the summary is displayed at a determined level of detail. The last line of the summary includes a description of sources of information regarding a ship date. In this example, the new ship date was based on comments from team members as well as a shared document. Display of this information is also configured to be selectable to provide access to information such as the shared document. Thus, as shown in FIGS. 8B and 8C, in response to the selection of the link to the shared document, the system can cause the communication application to transition to editing mode for the selected document. This allows users to not only view the document in detail, but this feature also allows a communication application to provide editing capabilities for a user viewing a summary. In addition, the application is configured to allow the user to gain permissions to the document in response to the selection of the link in the summary.

In some configurations, the system can receive a user selection of one or more sections of the summary and perform one or more actions based on the user selection. The user selection can be based on a voice command, a touch gesture, or a user gesture captured by one or more imaging devices. A section of a summary can include any section of text, an image, or a a link or representation of a file. Based on the user selection, the system can "pin" the selected sections, and the pinned sections can be designated for one or more actions. For instance, pinned items of a summary, such as a selected file, can be displayed to a user as shown in FIG. 8C or in FIG. 4. Pinned items may also be downloaded to a specific computing device from a server or a remote computing device. The display of the pinned items can be in display-only mode or in edit mode, such as the example shown in FIG. 8C.

In some configurations, pinned items can also be shared amongst selected individuals. Thus, after a user selects a number of items within the summary, the user can designate one or more users to receive those selected items. Designated users can receive the selected items in the form of any communication format, such as an email or a channel. Designated users can also receive the selected items in a summary that is tailored for each user. A system can also select users to receive the pinned items based on other factors. For instance, the system may automatically deliver content related to a pinned item based on the individuals named in a summary. In the example shown in FIG. 8C, once the user selects the shared document, each of the team peers associated with that section of the summary, e.g., the users listed in FIG. 4, can receive a copy of the file, or the system may automatically display the contents of the file to those users.

Figure 9:
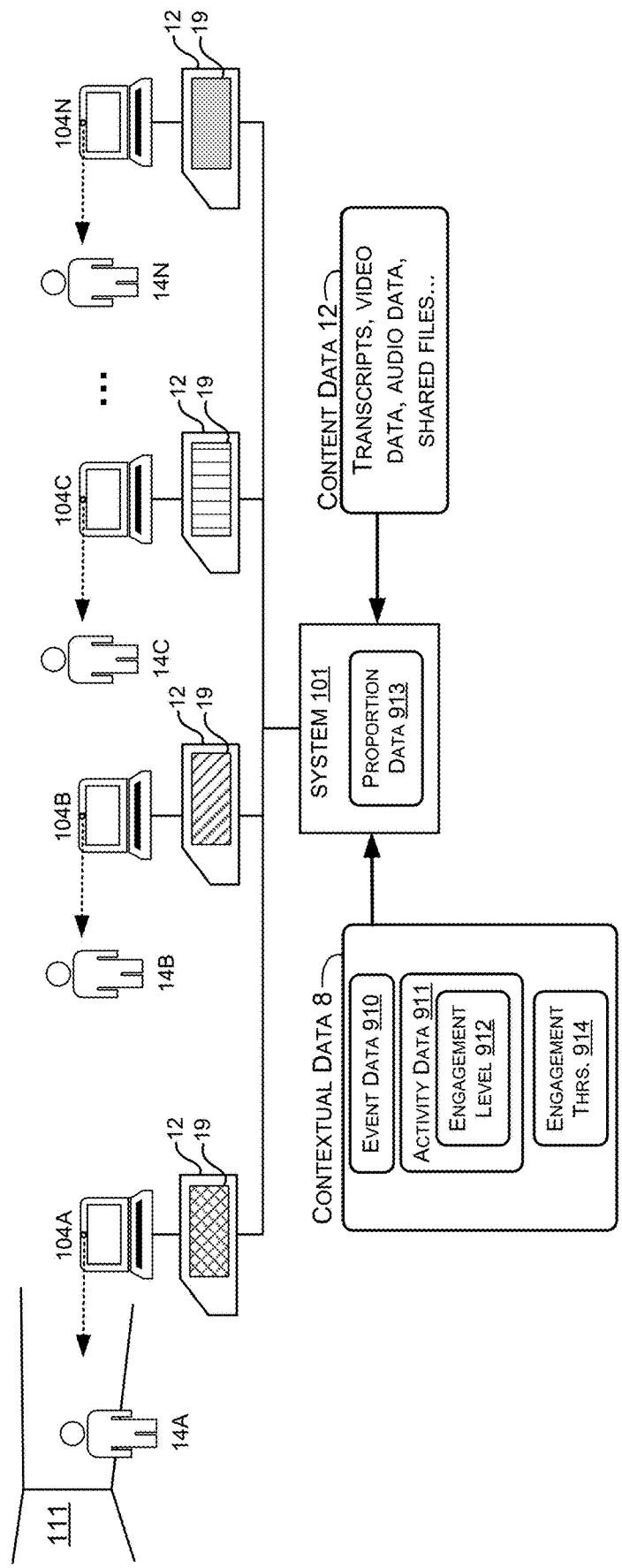
FIG. 9 illustrates aspects of a system for collecting contextual information associated with people participating in an event.

As summarized above, the summary can include representative colors and other information regarding a source of content. FIG. 9 illustrates aspects of a system for collecting contextual information such as the representative colors and other information regarding a source of content. In some configurations, a computing device 104 may be configured to utilize a camera to analyze a particular entity related to shared content 12. For instance, if a first user 14a provides content 12 to the communication system 101, the first computing device 104 can capture an image of the first user 14 and/or a surrounding environment 111. Physical characteristics of the first user and/or the surrounding environment 111 can be analyzed to identify one or more display properties, such as a color, that can be used to represent a user. Contextual data 8 representing the characteristic 19, e.g., a color or a particular display property, can be communicated in association with the content 12 to allow the system 101 to detect and maintain an association between the content and a source of the content. Thus, if the content 12 is included as part of a summary, the system can readily associate the characteristic 19, such as a representative color, of a source with a section of the summary. As shown, a number of different characteristics can be captured from each of the other users 14A-14N to provide characteristic data 19 along with the content while that is shared by each user.

The contextual data 8 can also have an event data 901, activity data 911, engagement level data 912 and data defining an engagement threshold 914. The event data can define meetings, broadcasts, channel conversations, or any other activity that can be associated with a collaboration among multiple people. The event data 901 can be in the form of a calendar event, multiple calendar events, or any other data format that defines a particular period of time.

The data defining the engagement level 912 can include any suitable data that indicates a user's engagement with respect to an event. For instance, data defining an engagement level can be provided by user input in the form of a response to a calendar event, interaction with a communication device, a generation of a counter event, etc. The data defining the engagement level of a user can also include location data, eye gaze direction data, data defining facial expressions, etc. The activity data 911 can define any type of user activity related to one or more events. For instance, the user activity may include a user's contribution of content to an event, e.g., sharing a file, editing a file, providing speech content to a transcript, attending a meeting, declining an invitation to a meeting, or any activity that can update content.

The combination of different types of user activity can be analyzed to determine if a user is engaged or not engaged with a particular portion of an event.

The data defining an engagement threshold 914 can be in any suitable format for defining criteria or conditions that are to be met with respect to the data defining the engagement level. For example, location data may be analyzed against a particular location threshold. If a user is beyond a predetermined distance from a particular event, the system may determine that the user does not have a threshold level of engagement with respect to that event.

Similar conditions may apply to other types of activity. For instance, if a user is attending a meeting and utilizes his or her mobile device to take a phone call, the system may determine that the user does not have a threshold level of engagement when the user's phone call lasts more than a threshold amount of time. In yet another example, when the system identifies that a user has a particular facial expression, the system can determine that the person has less than a threshold level of engagement. Other examples can involve image data or audio data captured by a camera or other device. In such embodiments, the system can determine if a person has engaged in a side conversation during a meeting. In response to detecting such activity, a system can determine that one or more users has less than the threshold level of engagement.

Figure 10:
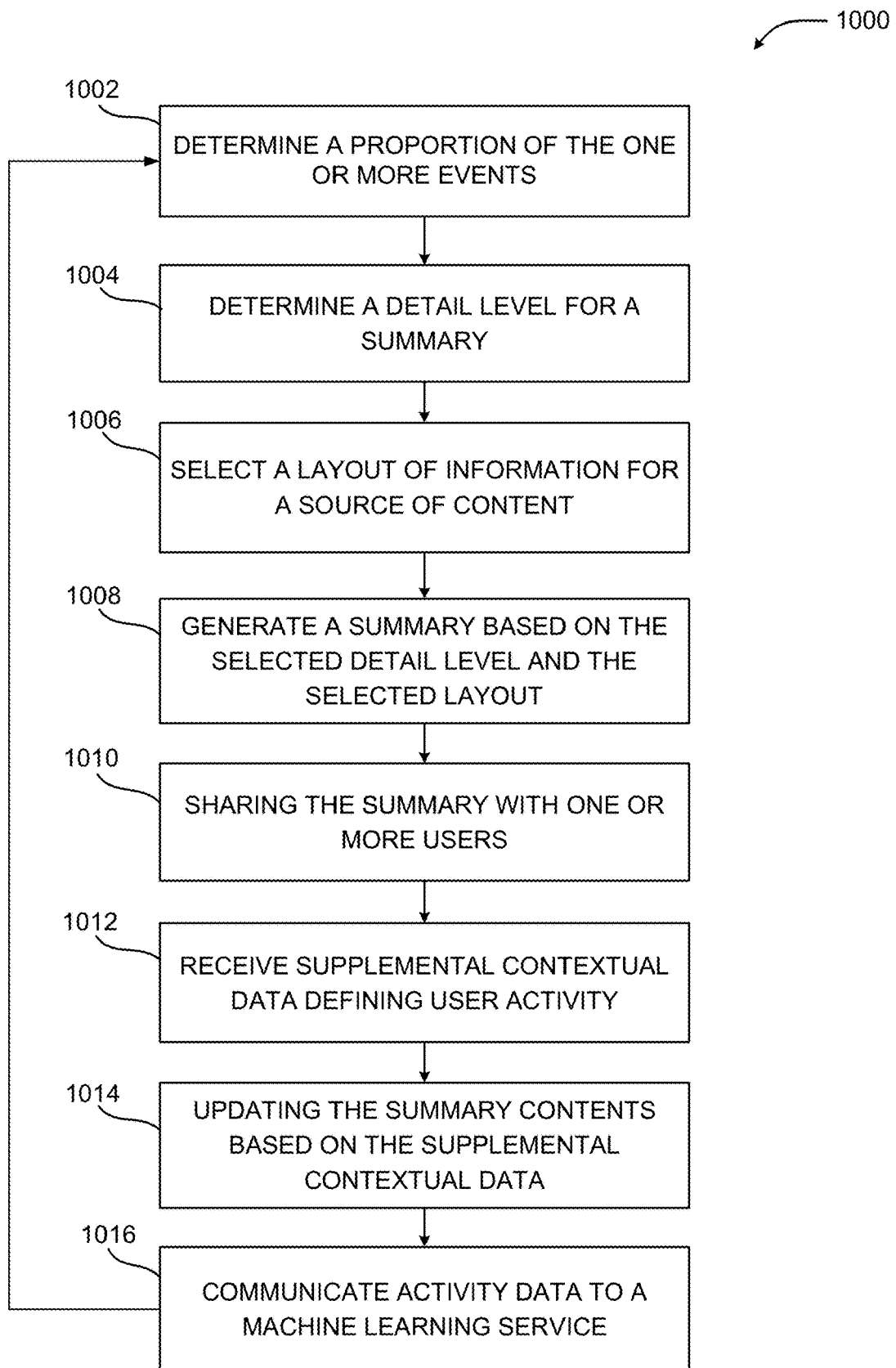
FIG. 10 illustrates a routine for generating one or more summaries having graphical associations between content and sources of content.

FIG. 10 is a flow diagram illustrating aspects of a routine 1000 for computationally efficient generation and management of a summary. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 1000 is described as running on a system 100, it can be appreciated that the routine 1000 and other operations described herein can be executed on an individual computing device, e.g., computing device 104, or several devices.

Additionally, the operations illustrated in FIG. 10 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 1000 begins at operation 1002, where the system determines a proportion of one or more events when a user had less than a threshold level of engagement. To make this determination, the system can obtain contextual data defining any suitable type of user activity. The contextual data can define any type of user activity such as a user input, a voice command, or one or more gestures performed by user. The contextual data can be generated by any type of input device, such as a mouse or keyboard, a camera, a sensor, microphone, or any other suitable type of peripheral input device. The contextual data can also be generated by a location system, mobile system, communication system, etc.

In some configurations, the system can determine if a user is below a threshold level of engagement with respect to an event by analyzing user gestures such as the user's location. Such information can be used to determine if the user is physically located at an event, or assess even more granular gestures indicating whether a person has left a room of an event. If the system determines that the user has left a location of an event, the system can determine that the user has less than a threshold level of engagement with that event. Calendar data or input data of a user can also be utilized to determine a user's level of engagement with respect to an event. For instance, if a user's calendar data indicates they will be out of the office, or otherwise cannot attend an event, the system could also utilize such data to determine that a user's engagement level with respect to an event is less than a threshold level.

In some configurations, the system can determine a proportion with respect to one or more events by analyzing data indicating the amount of time a user is not engaged with an event and data indicating a length of time of an event. In one illustrative example, if a user misses 30 minutes of a two-hour meeting, the system can determine a value that represents the proportion of the event in which the user was below a threshold level of engagement. In one specific example, the proportion can include a fractional value of 0.25 which represents the 30 minutes that the user missed of a two-hour meeting. The above-described example is provided for illustrative purposes and is not to be construed as limiting the type of data or value that can be used to indicate a proportion of an event.

At operation 1004, the system can determine the level of detail for a summary based on the analysis of contextual data indicating user activity. In one illustrative example, the system can determine the level of detail for a summary based on a user's engagement level with respect to one or more events. For instance, if a user had a threshold level of engagement with respect to an event, the system can utilize such activity to determine the level of detail for a summary. In another example, the system can determine the level of detail for a summary based on a time period or a proportion of an event when the user had less than a threshold level of engagement. The level of engagement can be determined by one or more actions such as receipt of an input indicating a user's unavailability with respect to one or more events. As described herein, the level of engagement can be determined by the analysis of other contextual data, such as communication data, location data, image data, etc. Different gestures or actions performed by a user can be used to determine a level of detail for a summary. In one example, the system can determine the level of detail for a summary based on the proportion of an event where a user had less than a threshold level of engagement. Based on the proportion, the system can determine a level of detail for a summary.

In addition, the detail level, e.g., level of detail, can be based on a quantity of content that is associated with the one or more events. For instance, if a meeting comprises a transcript having a number of statements or a particular number of words, the system can select a detail level based on such information. The size and/or quantity of shared files can also be analyzed to determine the level of detail. For instance, if the amount of information shared between one or more events is higher than a particular quantity, e.g., 100 megabytes, the system may select a lower level of detail, such as a first level or second level shown in FIG. 2. On the other hand, if the quantity of information shared within one or more events is above a particular quantity, the system may select another level of detail such as, the high detail levels depicted in FIG. 3 and FIG. 4.

As shown in the example of FIG. 2, if the proportion is greater than a threshold, e.g., a user missed a significant portion of a meeting, the system may generate a summary having a low level of detail. The system may also select simplified layouts of information indicating a source of the content, e.g., colors or shapes representing sources, etc.

As shown in the example of FIG. 3, if the proportion is less than a threshold, e.g., user missed just a few minutes of a meeting, the system may generate a summary having a high level of detail. The system may also select more complex layouts of information indicating a source, e.g., names, titles and other detailed information about a source of information.

These examples are provided for illustrative purposes and are not to be construed as limiting. It can be appreciated that the level of detail can be based on other types of contextual data including, a quantity of data that is shared during an event or a quantity of data that is shared during a period of time in which a user had less than a threshold level of engagement with an event. In such examples, if an event involves a number of participants sharing large volumes of data, and a user has missed a significant portion of the meeting event, the system may select a low level of detail for a summary. By providing a summary with a low level of detail, the system can allow the user to readily view key topics or relevant headlines. In such scenarios where the level of detail is low, the system can also generate layouts of information indicating a source of the key topics or relevant information.

A system can identify topics based on keywords identified within the content. Keywords having a high threshold level of relevancy to the contextual data associated with the user, such as a user's profile or files stored within a user's file storage system, can be identified as a topic for a summary. The topic can also be selected in response to detection of a high priority source of information. For instance, if a user's manager makes a comment during a meeting, that comment can be interpreted and selected as a topic for a summary. The system can select such content based on a user's relationship with a source. In such embodiments, the system can analyze an organizational chart to determine relationships between individuals. Information provided by teammates or a manager or other entities having a threshold level of relevancy can be indicated as a high-priority topic for a summary.

In some configurations, the detail level is based on a time period that a user's engagement level is below an engagement threshold. For instance, an initial detail level can be at a predetermined level when the time period that the engagement is below a threshold is within a first range. The initial detail level can then be raised or lowered when the time period is above or below the first range.

In some configurations, the detail level is based on a quantity of content that is associated with the one or more events. For instance, the initial detail level for a summary can be at a predetermined level when the quantity of content is within a particular range, e.g., between 100 MB and 500 MB. The initial detail level can then be raised or lowered if the quantity of content is above or below the range.

In some configurations, the detail level can be based on a quantity of content that is associated with the one or more events and a time period that the engagement level is below an engagement threshold. Any combination of thresholds can be utilized to determine a detail level. For instance, a detail level may be at a particular level if it is determined that the time period and the quantity of data are within respective ranges. The level of detail can then be raised or lowered if it is determined that the time period and/or the quantity of data is detected to be above or below the respective ranges. For instance, the initial detail level may be at the first level if it is determined that the time period and/or the quantity of data are both above one or more thresholds.

In another configuration, the detail level can be based on a number of participants associated with an event. For instance, the initial detail level can be based on contextual data indicating that a number of participants are within a particular range. The initial detail level can be raised or lowered when the contextual data indicates that the number of participants is below or above the range. For instance, the initial detail level may be at the first level if it is determined that the number of participants of one or more events is above a threshold. Any combination of factors described herein can be utilized to determine a detail level for a summary.

At operation 1006, the system can select a layout of information for a indicating a source of the content. The layout can be based on a number of different factors. In one illustrative example, the layout can be selected based on the level of detail that is determined for a summary. Based on the level of detail, the system can identify associated layouts for information that is summarized at a particular level of detail. Associations between a level of detail and a layout can be defined in one or more data structures, such as the association data shown in FIGS. 4A, 4B, and 4C. In such examples, different layouts can be utilized based on a selected level of detail.

At operation 1008, the system can generate a summary based on the selected data level and the selected layout. As shown in FIG. 1, a system can generate a summary having a particular level of detail based on one or more criteria. When the system selects a particular level of detail, a summary can be generated at that level of detail and displayed to a user automatically. At operation 1008, the system may generate a summary comprising the layout 45 of information that associates a source with portions of the content 12 that are selected based on the detail level 20. The source can be a user, such as the first user 14A, or a computer, such as the first computing device 104A of FIG. 1.

In some configurations, as part of operation 1008 or any other operation, the system can analyze the content that is associated with one or more events to determine a number of topics. For instance, content shared between users, such as files, and other data can be analyzed. In some configurations, the system can analyze transcripts of a meeting. Topics can be selected based on the identification of predetermined keywords and/or phrases. The system can identify salient portions of the content by the use of the keywords. In some configurations, salient portions of the content can be identified by the use of one or more keywords that indicates a task. Tasks associated with the task owner are selected for inclusion into a summary. Other topics identified by the use of keywords that may be important to a user may also be selected. Such a selection may be based on a user's particular activities or preference files. For instance, if a number of keywords exist in a person's data store, such as OneDrive or Google Drive, the system may identify one or more topics as salient content for that particular person.

In some configurations, the content can be analyzed and parsed to identify tasks. Tasks can be identified by the use of a number of determined keywords such as "complete," "assign," "deadline," "project," etc. For example, if a sentence has a threshold number of keywords, the system can identify usernames or identities in or around the sentence. Such correlations can be made to identify a task for an individual, and a summary of the task can be generated based on a sentence or phrase identifying the username and the keywords. High-priority topics having a threshold level of relevancy to user activities can include specific keywords related to data stored in association with the user. For instance, if a meeting recording identifies a number of topics, the system can analyze files stored in association with individual attendees. If one of the stored files, such as a number of documents associated with a particular user, are relevant to a topic raised during the meeting, that topic may be identified as a key topic for the user and a description of the topic may be included in a summary for that user.

The system can also analyze content to identify a source of any content associated with the topic. A source may be identified by the use of voice recognition software, indicators within a file, or identifiers within a transcript. Any data within the analyzed content can be used to identify a source of information. The system may then generate metadata for a summary to track an association between sections of a summary and a source that provided the content of each section.

At operation 1010, the system can share a copy of the generated summary with one or a number of users. In some configurations, the system can send a copy of the summary to users having an association with the summary. For instance, if a summary indicates a number of users have tasks, each of those task owners can automatically receive a copy of the summary. At operation 1010, the system can also cause the display of the summary on a display device of a data processing system, e.g., the computing device 104N in association with a user 14N.

At operation 1012, the system receives supplemental contextual data defining user activity. In some configurations, the supplemental contextual data can be in the form of user input. The user input can be utilized to control the level of detail of the summary. As shown in FIG. 5 through FIG. 7, the system can receive user input allowing the user to increase or decrease the level of detail for a display summary. For instance, if the system determines that an initial level of detail is the first level of detail shown in FIG. 5, the user input can be used to increase the level of detail for the summary, which in turn causes a display of different layouts of information indicating a source of the information. Thus, the user can traverse from the first level of detail to the second level of detail, or to any other level of detail by the use of an input. The user input can be in any form, such as an interaction with a graphical user interface, a touchscreen, or any other input device. The user input can also include voice commands or other gestures performed by a user.

In some configurations, the supplemental contextual data can define activity performed by a source of content. For instance, if a summary includes transcripts of the meeting and some of the quotes of the transcript are from a participant of the meeting, that participant's subsequent activities can be used to update the summary. For instance, if an original transcript of a meeting indicates that the user stated a particular deadline for a project and that deadline was included in the summary, the summary can be updated if that participant is involved in a subsequent meeting and states a new date for the deadline.

At operation 1014, in response to any supplemental contextual data defining user activity, the system can update the summary contents. The update to the summary contents can include changing the level of detail that is applied to the display of the summary contents. In some configurations, the update to the summary contents can also include changing the contents based on the supplemental contextual data.

Next, at operation 1016, the system can communicate any user activity data, such as a selection of a summary or interaction with the summary, to a machine learning service. Data defining any type of user activity can be communicated to the machine learning service for the purpose of improving the contextual data utilized to determine a user's levels of engagement. Data defining any type of user activity can also be communicated to a machine learning service for the purpose of improving the contextual data utilized to generate and arrange the display of the computer-generated summaries. Thus, as shown in FIG. 10, when the routine 1000 has completed operation 1016 and returns to operation 1002, the results of future iterations of the routine 1000 can produce more refined summaries that are contextually relevant to a user. In addition, future iterations of the routine 1000 can produce more refined determinations regarding a user's level of engagement. For instance, the system can raise or lower one or more thresholds when a system receives input data indicating a user selection of a summary or a selection of a section of a summary. In one example, the system can receive a user input indicating a selection of a section of the summary. The system can then generate a graphical element in response to the selection, wherein the graphical element indicates an event or the portion of the content associated with the section of the summary. This interaction with a summary can cause a computer to communicate user activity defining the selection of the section of the summary to a remote computing device for the purpose of generating a priority of a topic associated with the section of the summary. The priority can cause the system to adjust the engagement threshold to improve the accuracy of the start time or the end time. Any threshold can be adjusted based on a user input applied to a summary.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
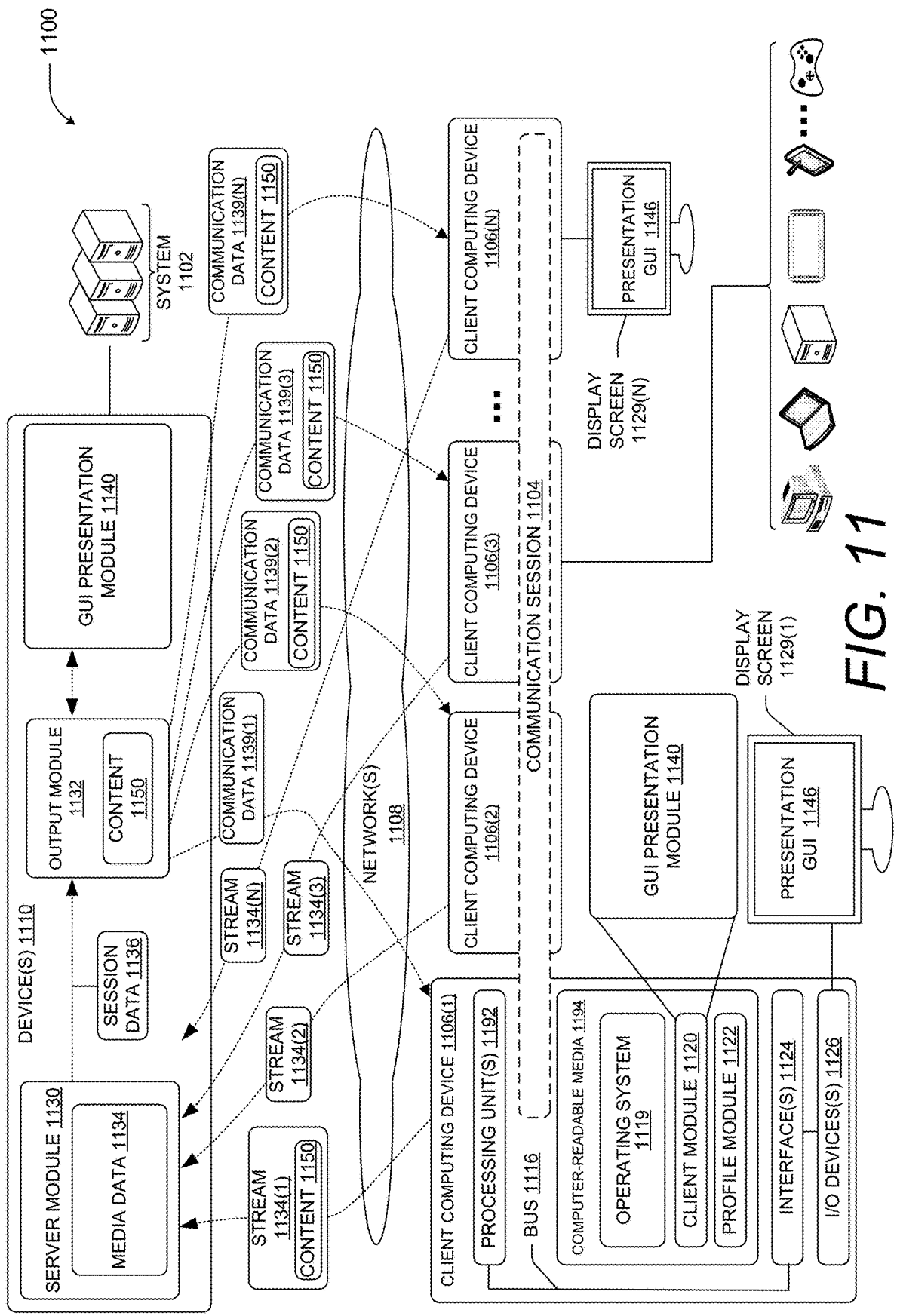
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 may function to collect, analyze, and share content that is displayed to users of a communication session 1104. As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104. The client computing devices 1106 can corelate to the user computing devices 104 shown in FIG. 1. Although some examples show one of the computers 1106 processing aspects of the present techniques, it can be appreciated that the techniques disclosed herein can be applied to other computing devices and are not to be construed as limiting.

In this example, the communication session 1104 is hosted, over one or more network(s) 1108, by the system 1102. That is, the system 1102 can provide a service that enables users of the client computing devices 1106(1)

through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In the examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations. Each stream can also include text, audio and video data, such as the data communicated within a channel, chat board, or a private messaging service.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) (which are also referred to herein as computing devices 104A-104N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices (not shown in FIG. 11) to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(1)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) (each of which are also referred to herein as a "data processing system") may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(3) participating in a live viewing of the communication session). The communication data 1139 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include GUI presentation module 1140. The GUI presentation module 1140 may be configured to analyze communication data 1139 that is for delivery to one or more of the client computing devices 1106. Specifically, the GUI presentation module 1140, at the device(s) 1110 and/or the client computing device 1106, may analyze communication data 1139 to determine an appropriate manner for displaying video, image, and/or content on the display screen 1129(1) of an associated client computing device 1106. In some implementations, the GUI presentation module 1140 may provide video, image, and/or content to a presentation GUI 1146 rendered on the display screen 1129(1) of the associated client computing device 1106. The presentation GUI 1146 may be caused to be rendered on the display screen 1129(1) by the GUI presentation module 1140. The presentation GUI 1146 may include the video, image, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, and a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had while viewing the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 12:
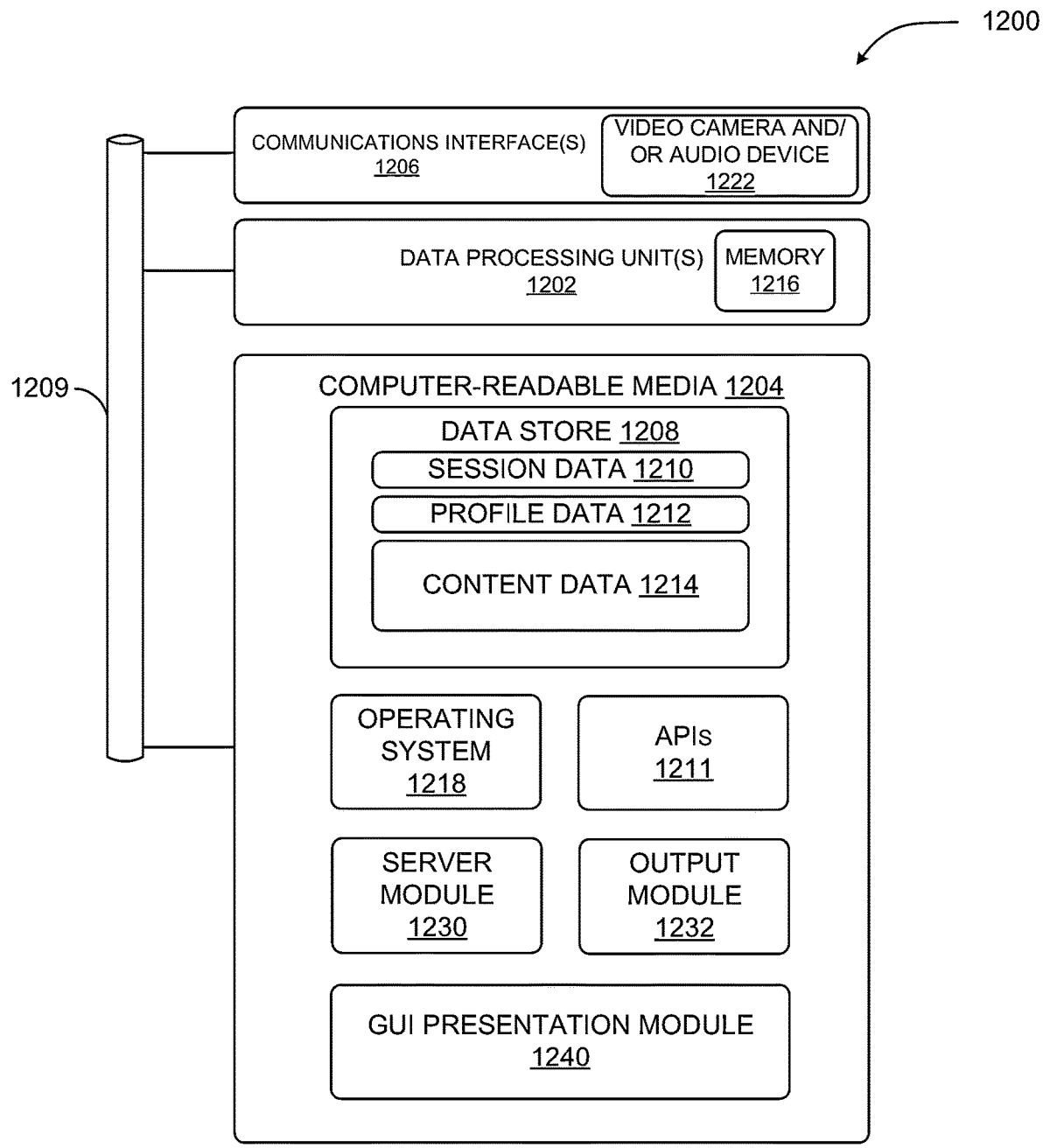
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device") configured to generate data for some of the user interfaces disclosed herein. The device 1200 may generate data that may include one or more sections that may render or comprise video, images, virtual objects, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") (not shown in FIG. 12) or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210 (e.g., session data 1136), profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1211 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The disclosure presented herein also encompasses the subject matter set forth in the following clauses:

Clause 1: A method to be performed by a data processing system, the method comprising: receiving contextual data indicating an engagement level of a user with respect to one or more events; determining a detail level for generating a summary of content associated with the one or more events, wherein the detail level is based on the engagement level; selecting a portion of the content based on the detail level; selecting a layout of information that identifies a source of the portion of the content, wherein the layout of information is selected based on the detail level; generating the summary comprising a rendering of the layout of information associating the source with the portion of the content; and causing a display of the summary on a display device in communication with the data processing system.

Clause 2: The method of clause 1, further comprising modifying the display of the summary to include an updated layout of information that associates the source with an updated portion of the content in response to an input or a triggering event that indicates a new detail level, the updated layout and the updated portion of the content selected from the content based on the new detail level.

Clause 3: The method of clauses 1 or 2, further comprising: receiving a user input indicating a new detail level; selecting an updated portion of the content based on the new detail level; generating an updated summary comprising the updated portion of the content, wherein the updated summary comprises the layout of information that identifies the source of the updated portion of the content; and causing a display of the updated summary on the display device of the data processing system.

Clause 4: The method of any of clauses 1-3, further comprising: receiving a user input indicating a new detail level and a section of the summary; selecting a new layout of information that identifies the source associated with the section of the summary; generating an updated summary based on the new layout that associates the section of the summary; and causing a display of the updated summary on the display device of the data processing system, the summary comprising a selection of the content based on the new detail level.

Clause 5: The method of any of clauses 1-4, further comprising: analyzing the content to determine a number of topics; and selecting a topic of the number of topics, the topic having a threshold level of relevancy to the user, wherein the portion of the content includes sections of the content related to the topic.

Clause 6: The method of any of clauses 1-5, wherein the detail level is based on a time period that the engagement level is below an engagement threshold.

Clause 7: The method of clauses 1-6, wherein the detail level is further based on a quantity of content that is associated with the one or more events.

Clause 8: The method of any of clauses 1-7, wherein the detail level is further based on a quantity of content that is associated with the one or more events and a time period that the engagement level is below an engagement threshold.

Clause 9: The method of any of clauses 1-8, further comprising: determining a proportion of the one or more events when the engagement level is below an engagement threshold, wherein the detail level is based a proportion of the one or more events when the engagement level is below the engagement threshold.

Clause 10: The method of any of clauses 1-9 further comprising: receiving image data of a user or an environment associated with the user, the user having an association with the portions of the content; analyzing the image data to determine at least one color associated with the user; and modifying the layout to comprise the at least one color to identify the user or the environment associated with the user.

Clause 11: A system, comprising: one or more data processing units; and a computer-readable medium having encoded thereon computer-executable instructions to cause the one or more data processing units to: receive contextual data indicating activity of one or more users associated with one or more events; determine a detail level for generating a summary of content associated with the one or more events, wherein the detail level is based on the activity of one or more users; select a portion of the content based on the detail level; select a layout of information that identifies a source of the content, wherein the layout of information is selected based on the detail level; generate the summary based on the layout of information that associates the source, with the portion of the content that is selected based on the detail level; and cause a display of the summary on a display device of the system.

Clause 12: The system of clause 11, wherein instructions further cause the one or more data processing units to: analyze the activity of the one or more users to determine a proportion of the one or more events when the engagement level is below an engagement threshold, wherein the detail level is above a predetermined level when the proportion of the engagement is below a predetermined proportion limit.

Clause 13: The system of clauses 11 and 12, wherein instructions further cause the one or more data processing units to: analyze the activity of the one or more users to determine a proportion of the one or more events when the engagement level is below an engagement threshold, wherein the detail level is below a predetermined level when the proportion of the engagement is above a predetermined proportion limit.

Clause 14: The system of any of clauses 11-13, wherein the contextual data indicates a number of users of the one or more users associated with one or more events, wherein the detail level is based on the number of users.

Clause 15: The system of any of clauses 11-14, wherein the contextual data indicates a quantity of the content that is shared by the one or more users, wherein the detail level is based on the quantity of the content that is shared by the one or more users.

Clause 16: A system, comprising: receiving, at the system, contextual data indicating activity of one or more users associated with one or more events; means for determining a detail level for generating a summary of content associated with the one or more events, wherein the detail level is based on the activity of one or more users; means for selecting a portion of the content based on the detail level; means for generating the summary having a layout of information that associates a source of the portion of the content with a display of the portion of the content; and means for displaying the summary on a display device of the system.

Clause 17: The system of clause 16, further comprising: means for receiving image data of a user or an environment associated with the user, the user having an association with the portions of the content; means for analyzing the image data to determine at least one color associated with the user; and means for modifying the layout to comprise the at least one color to identify the user or the environment associated with the user.

Clause 18: The system of any of clauses 16 and 17, further comprising: means for receiving a user input indicating a new detail level and a section of the summary; means for selecting a new layout of information that identifies the source associated with the section of the summary; means for generating an updated summary based on the new layout that associates the section of the summary; and means for displaying of the updated summary on the display device of the system, the summary comprising a selection of the content based on the new detail level.

Clause 19: The system of any of the clauses 16-18 wherein the contextual data indicates a number of users of the one or more users associated with one or more events, wherein the detail level is based on the number of users or a quantity of the content shared during the one or more events.

Clause 20: The system of any of the clauses 16-19, further comprising: means for receiving a user input selecting at least a section of the summary; means for generating a graphical element indicating the selection of the section of the summary; and means for communicating a file associated with the selected section to a computing device associated with a user providing the user input.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method performed by a data processing system for analyzing segments of a document having content to identify one or more users for generating graphical associations between the one or more users and sections of a summary of the document, the method comprising:
   analyzing the document to identify a respective source of information of an individual segment of the document;
   according to the respective source of information, selecting the one or more users associated with the respective source of information, wherein the selection of the one or more users is based on the one or more users having a threshold level of relevancy with the individual segment of the document, wherein other users that do not have the threshold level of relevancy are not selected for inclusion in the summary;

generating the summary comprising multiple sections with each section of the summary being associated with individual segments of the document, the summary further comprising graphical elements individually associating the one or more users with corresponding sections of the summary; and causing a display of the summary on a display device in communication with the data processing system.

2. The method of claim 1, wherein the document comprises a transcript of a meeting, wherein analyzing the document to identify the respective source of information of the individual segment of the document includes analyzing individual statements of the transcript to identify individual users associated with the individual statements, wherein the individual users have the threshold level of relevancy if the individual users have a predetermined position on an organizational chart relative to a user associated with the display device.

3. The method of claim 1, wherein the document comprises at least one of video data, audio data, or a shared file, wherein analyzing the document to identify the respective source of information of the individual segment of the document includes analyzing individual statements of the video data, audio data, or the shared file to identify individual users associated with the individual statements, wherein the individual users have the threshold level of relevancy if the individual users have a predetermined position on an organizational chart relative to a user associated with the display device.

4. The method of claim 1, further comprising:
determining a detail level for the summary of the content associated with the one or more users, wherein the detail level is based on the respective source of information; and
selecting a layout of information that identifies the one or more users having the threshold level of relevancy with the individual segment of the document, wherein the layout of information is selected based on the detail level, wherein the summary is generated based on the selected layout.

5. The method of claim 1, further comprising: modifying the display of the summary to include an updated layout of information that associates the source with an updated portion of the content in response to an input or a triggering event that indicates a new detail level, the updated layout and the updated portion of the content selected from the content based on the new detail level.

6. The method of claim 1, further comprising:
receiving a user input indicating a new detail level;
selecting an updated portion of the content based on the new detail level;
generating an updated summary comprising the updated portion of the content, wherein the updated summary comprises the layout of information that identifies the source of the updated portion of the content; and
causing a display of the updated summary on the display device of the data processing system.

7. The method of claim 1, further comprising:
receiving a user input indicating a new detail level and a section of the summary;
selecting a new layout of information that identifies the source associated with the section of the summary;
generating an updated summary based on the new layout that associates the section of the summary; and causing a display of the updated summary on the display device of the data processing system, the summary comprising a selection of the content based on the new detail level.

8. A system for analyzing segments of a document having content to identify one or more users for generating graphical associations between the one or more users and sections of a summary of the document, the system comprising:
one or more processing units; and
a computer-readable storage medium having encoded thereon computer-executable instructions to cause the one or more processing units to:
analyze the document to identify a respective source of information of an individual segment of the document;
according to the respective source of information, select the one or more users associated with the respective source of information, wherein the selection of the one or more users is based on the one or more users having a threshold level of relevancy with the individual segment of the document, wherein other users that do not have the threshold level of relevancy are not selected for inclusion in the summary;
generate the summary comprising multiple sections with each section of the summary being associated with individual segments of the document, the summary further comprising graphical elements individually associating the one or more users with corresponding sections of the summary; and
cause a display of the summary on a display device in communication with the data processing system.

9. The system of claim 8, wherein the document comprises a transcript of a meeting, wherein analyzing the document to identify the respective source of information of the individual segment of the document includes analyzing individual statements of the transcript to identify individual users associated with the individual statements, wherein the individual users have the threshold level of relevancy if the individual users have a predetermined position on an organizational chart relative to a user associated with the display device.

10. The system of claim 8, wherein the document comprises at least one of video data, audio data, or a shared file, wherein analyzing the document to identify the respective source of information of the individual segment of the document includes analyzing individual statements of the video data, audio data, or the shared file to identify individual users associated with the individual statements, wherein the individual users have the threshold level of relevancy if the individual users have a predetermined position on an organizational chart relative to a user associated with the display device.

11. The system of claim 8, wherein the instructions further cause the one or more processing units to:
determine a detail level for the summary of the content associated with the one or more users, wherein the detail level is based on the respective source of information; and
select a layout of information that identifies the one or more users having the threshold level of relevancy with the individual segment of the document, wherein the layout of information is selected based on the detail level, wherein the summary is generated based on the selected layout.

12. The system of claim 8, wherein the instructions further cause the one or more processing units to: modify the display of the summary to include an updated layout of information that associates the source with an updated portion of the content in response to an input or a triggering event that indicates a new detail level, the updated layout and the updated portion of the content selected from the content based on the new detail level.

13. The system of claim 8, wherein the instructions further cause the one or more processing units to:
   receive a user input indicating a new detail level;
   select an updated portion of the content based on the new detail level;
   generate an updated summary comprising the updated portion of the content, wherein the updated summary comprises the layout of information that identifies the source of the updated portion of the content; and
   cause a display of the updated summary on the display device of the data processing system.

14. The system of claim 8, wherein the instructions further cause the one or more processing units to:
   receive a user input indicating a new detail level and a section of the summary;
   select a new layout of information that identifies the source associated with the section of the summary;
   generate an updated summary based on the new layout that associates the section of the summary; and
   cause a display of the updated summary on the display device of the data processing system, the summary comprising a selection of the content based on the new detail level.

15. A computer-readable storage medium having encoded thereon computer-executable instructions to cause one or more processing units of a system to analyze segments of a document having content to identify one or more users for generating graphical associations between the one or more users and sections of a summary of the document, computer-executable instructions to cause one or more processing units of a system to:
   analyze the document to identify a respective source of information of an individual segment of the document;
   according to the respective source of information, select the one or more users associated with the respective source of information, wherein the selection of the one or more users is based on the one or more users having a threshold level of relevancy with the individual segment of the document, wherein other users that do not have the threshold level of relevancy are not selected for inclusion in the summary;
   generate the summary comprising multiple sections with each section of the summary being associated with individual segments of the document, the summary further comprising graphical elements individually associating the one or more users with corresponding sections of the summary; and
   cause a display of the summary on a display device in communication with the data processing system.

16. The computer-readable storage medium of claim 15, wherein the document comprises a transcript of a meeting, wherein analyzing the document to identify the respective source of information of the individual segment of the document includes analyzing individual statements of the transcript to identify individual users associated with the individual statements, wherein the individual users have the threshold level of relevancy if the individual users have a predetermined position on an organizational chart relative to a user associated with the display device.

17. The computer-readable storage medium of claim 15, wherein the document comprises at least one of video data, audio data, or a shared file, wherein analyzing the document to identify the respective source of information of the individual segment of the document includes analyzing individual statements of the video data, audio data, or the shared file to identify individual users associated with the individual statements, wherein the individual users have the threshold level of relevancy if the individual users have a predetermined position on an organizational chart relative to a user associated with the display device.

18. The computer-readable storage medium of claim 15, wherein the instructions further cause the one or more processing units to:
   determine a detail level for the summary of the content associated with the one or more users, wherein the detail level is based on the respective source of information; and
   select a layout of information that identifies the one or more users having the threshold level of relevancy with the individual segment of the document, wherein the layout of information is selected based on the detail level, wherein the summary is generated based on the selected layout.

19. The computer-readable storage medium of claim 15, wherein the instructions further cause the one or more processing units to: modify the display of the summary to include an updated layout of information that associates the source with an updated portion of the content in response to an input or a triggering event that indicates a new detail level, the updated layout and the updated portion of the content selected from the content based on the new detail level.

20. The computer-readable storage medium of claim 15, wherein the instructions further cause the one or more processing units to:
   receive a user input indicating a new detail level;
   select an updated portion of the content based on the new detail level;
   generate an updated summary comprising the updated portion of the content, wherein the updated summary comprises the layout of information that identifies the source of the updated portion of the content; and
   cause a display of the updated summary on the display device of the data processing system.

* * * * *